(12) United States Patent
Gudibanda et al.

(10) Patent No.: US 10,924,418 B1
(45) Date of Patent: Feb. 16, 2021

(54) SYSTEMS AND METHODS FOR FAST DETECTION OF ELEPHANT FLOWS IN NETWORK TRAFFIC

(71) Applicant: Reservoir Labs, Inc., New York, NY (US)

(72) Inventors: Aditya Gudibanda, Jersey City, NJ (US); Jordi Ros-Giralt, Newport Beach, CA (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 16/270,089

(22) Filed: Feb. 7, 2019

Related U.S. Application Data

(60) Provisional application No. 62/627,305, filed on Feb. 7, 2018.

(51) Int. Cl.
*G06F 15/16* (2006.01)
*H04L 12/851* (2013.01)
*H04L 12/26* (2006.01)

(52) U.S. Cl.
CPC ...... *H04L 47/2441* (2013.01); *H04L 43/0894* (2013.01)

(58) Field of Classification Search
CPC .......... H04L 43/0894; H04L 47/2441
See application file for complete search history.

(56) References Cited

U.S. PATENT DOCUMENTS

| | | | | |
|---|---|---|---|---|
| 9,246,828 B1* | 1/2016 | Tagore | ................... | H04L 47/25 |
| 9,929,933 B1* | 3/2018 | Viljoen | ................... | H04B 10/27 |
| 9,979,624 B1* | 5/2018 | Volpe | ................... | H04L 43/0894 |
| 10,003,515 B1* | 6/2018 | Whiteside | ............. | H04L 43/026 |
| 10,033,613 B1* | 7/2018 | Whiteside | ........... | H04L 43/0882 |
| 10,097,464 B1* | 10/2018 | Conlon | ................. | H04L 47/125 |
| 10,129,135 B1* | 11/2018 | Viljoen | ................... | H04L 45/08 |
| 2010/0161791 A1* | 6/2010 | Duffield | ................ | H04L 43/026 |
| | | | | 709/224 |
| 2015/0089045 A1* | 3/2015 | Agarwal | ................ | H04L 43/04 |
| | | | | 709/224 |
| 2016/0261510 A1* | 9/2016 | Burnette | ............. | H04L 43/0882 |
| 2019/0238461 A1* | 8/2019 | Miller | ................. | H04L 47/2483 |

OTHER PUBLICATIONS

Jordi Ros-Giralt, et al., "High-Performance algorithms and data structures to catch elephant flows", Sep. 13-15, 2016, IEEE, pp. 1-12 (Year: 2016).*

Zahra Jadidi, et al., "Intelligent Sampling Using an Optimized Neural Network", Jan. 2016, Journal of Networks, pp. 16-25 (Year: 2016).*

(Continued)

*Primary Examiner* — Jonathan A Bui
(74) *Attorney, Agent, or Firm* — Goodwin Procter LLP

(57) ABSTRACT

In a system for efficiently detecting large/elephant flows in a network, the rate at which the received packets are sampled is adjusted according to a top flow detection likelihood computed for a cache of flows identified in the arriving network traffic. After observing packets sampled from the network, Dirichlet-Categorical inference is employed to calculate a posterior distribution that captures uncertainty about the sizes of each flow, yielding a top flow detection likelihood. The posterior distribution is used to find the most likely subset of elephant flows. The technique rapidly converges to the optimal sampling rate at a speed $O(1/n)$, where n is the number of packet samples received, and the only hyperparameter required is the targeted detection likelihood.

40 Claims, 10 Drawing Sheets

(56) References Cited

OTHER PUBLICATIONS

G. Einziger et al., "Independent counter estimation buckets," in Proc. IEEE Infocom, vol. 26, pp. 2560-68, (2015).
G. Cormode and S. Muthukrishnan, "An improved data stream summary: the count-min sketch and its applications," Journal of Algorithms, 55(1):58-75,(2005).
R. Ben Basat et al., "Optimal elephant flow detection," in Proc. IEEE Infocom (2017).
L. Yi et al., "ElephantTrap: A low cost device for identifying large flows," in Proc. 15th Annual IEEE Symposium on High-Performance Interconnects, Hot Interconnects, pp. 99-105 (2007).
T. Fioreze et al., "A Statistical Analysis of Network Parameters for the Self-management of Lambda-Connections" Aims, 5637:15-27 (2009).
K. C. Lan and J. Heidemann, "A measurement study of correlations of Internet flow characteristics" Computer Networks, 50(1):46-62 (2006).
S. Sarvotham, et al., "Connection-level analysis and modeling of network traffic," in Proc. 1st ACM SIGCOMM Workshop on Internet Measurement, pp. 99-103 (2001).
K. Psounis et al., "SIFT: A simple algorithm for tracking elephant flows, and taking advantage of power laws." available at http://www.stanford.edu/balaji/papers/05sifta.pdf (2005).
John D. Cook, "Numerical Computation of Stochastic Inequality Probabilities," Univ. Of Texas, MD Anderson Cancer Center Department of Biostatistics Working Paper Series, Paper 46 (First published in 2003; revised in 2005 and 2008), available at https://www.johndcook.com/numerical_inequality_probabilities.pdf.

\* cited by examiner

Algorithm 1: process_sample()

1. Initialize $p[\gamma][\gamma]$;
2. Initialize $a[\gamma]$;
3. Initialize $b[\gamma]$;
4. Initialize $d[\gamma - 1]$;
5. for $1 \leq i \leq \gamma$ do
6.     for $1 \leq j \leq \gamma$ do
7.         $p[i][j] = 0.5$;
8. begin
9.     for *sample* $s_i$ do
10.         for $1 \leq i \leq \gamma$ do
11.             for $1 \leq j \leq \gamma$ do
12.                 if $s_i$ *is from flow i and not flow j* then
13.                     $p[i][j] = p[i][j] + g_{1,0}(a[i], b[i], a[j], b[j])$;
14.                 if $s_i$ *is from flow j and not flow i* then
15.                     $p[i][j] = p[i][j] + g_{0,1}(a[i], b[i], a[j], b[j])$;
16.                 if $s_i$ *is neither from flow i nor flow j* then
17.                     $p[i][j] = p[i][j] + g_{0,0}(a[i], b[i], a[j], b[j])$;
18.             if $s_i$ *is from flow i* then
19.                 $a[i] = a[i] + 1$;
20.             else
21.                 $b[i] = b[i] + 1$;
22.         $d$ = calculate_detection_likelihoods();
23.         choose_$\epsilon$_and_adjust_sampling_rate();

FIG. 2A

Algorithm 2: choose_ϵ_and_adjust_sampling_rate()

1    $target_{dl}$: target detection likelihood;
2    begin
3        best_ϵ = −1;
4        for $1 \leq \epsilon \leq \gamma - 1$ do
5            if $d[\epsilon] > target_{dl}$ then
6                best_ϵ = ϵ;
7        if best_ϵ = −1 then
8            increase_sampling_rate();
9        else
10           decrease_sampling_rate();

FIG. 2B

Algorithm 3: calculate_detection_likelihoods()

1    begin
2        Initialize $d[\gamma - 1]$;
3        for $1 \leq i < \gamma$ do
4            if $i = 1$ then
5                $d[i] = 1$
6                for $2 \leq j \leq \gamma$ do
7                    $d[1] = d[1] \cdot p[1][j]$;
8            else
9                $d[i] = d[i-1]$;
10                for $1 \leq j \leq i - 1$ do
11                    $d[i] = \frac{d[i]}{p[j][i]}$;
12                for $i + 1 \leq j \leq \gamma$ do
13                    $d[i] = d[i] \cdot p[i][j]$

FIG. 2C (b) $\gamma = 10$ and $\epsilon = 3$.

(a) $\gamma = 10$ and $\epsilon = 2$.

(d) $\gamma = 10$ and $\epsilon = 5$.

(c) $\gamma = 10$ and $\epsilon = 4$.

(a) $\gamma = 100$ and $\epsilon = 2$.

(b) $\gamma = 100$ and $\epsilon = 3$.

(d) $\gamma = 100$ and $\epsilon = 5$.

(c) $\gamma = 100$ and $\epsilon = 4$.

(a) $\gamma = 10$ (b) $\gamma = 40$ (c) $\gamma = 100$ (d) $\gamma = 200$

SYSTEMS AND METHODS FOR FAST DETECTION OF ELEPHANT FLOWS IN NETWORK TRAFFIC

CROSS-REFERENCE TO RELATED APPLICATIONS

This application claims priority to and benefit of U.S. Provisional Patent Application No. 62/627,305, entitled "Systems and Methods for Optimally Sampling Network Traffic," filed on Feb. 7, 2018, the entire contents of which are incorporated herein by reference.

GOVERNMENT LICENSE RIGHTS

This invention was made with Government support under contract number DE-SC0011358 awarded by the United States Department of Energy. The Government has certain rights in the invention.

FIELD OF THE INVENTION

This disclosure generally relates to sampling and analyzing network flows and, in particular, to tuning the rate of sampling such that relatively large flows can be distinguished efficiently from relatively small flows.

BACKGROUND

Since its inception, the Internet has experienced a remarkable growth due to one simple but critical design paradigm: simplicity. This principle ensures that the core of the network is kept scalable, maximizing network availability and robustness. As a sign of its success, today more than 20 billion devices are connected to the global Internet delivering unprecedented levels of connectivity. Yet while this principle has been instrumental to ensure the network's scalability, it has come with a cost manifested by the network's inability to guarantee the Quality of Service (QoS) experienced by the applications.

From this perspective, the trade-off of scalability versus QoS defines a spectrum of possible Internet architectures. On one edge of this spectrum, scalability is maximized by using the simplicity paradigm, at the cost of providing no QoS. On the other edge, complexity is added to the core of the network to implement QoS, at the cost of severely limiting scalability. A good architecture is thus one that exploits arbitrage conditions found within this spectrum, i.e., sweet-spots that allow to significantly increase QoS (or scalability) without substantially decreasing scalability (or QoS).

The problem of elephant flow detection can be understood as an attempt to identify one of these sweet-spot regions. Elephant flows are informally defined as flows in a network that are large enough (e.g., high-rate flows or high byte count flows) to negatively affect the QoS of the smaller mouse flows. Because of the lack of QoS support, IP routers do not have a good way to differentiate large flows from small flows. Thus, the presence of one or just a few elephant flows can drastically deteriorate the QoS of a large number of mouse flows if they share the same router resource.

One approach to resolve this issue is to implement per-flow queuing, a solution in which routers maintain a separate queue for each flow. While this ensures fine-grained control of the QoS assigned to each flow independently, its implementation is unscalable as the number of flows grows unbounded. Instead, a sweet-spot solution consists in separating the elephants and the mice into two separate queues and apply different QoS policies to them (e.g., assigning higher priority to the mouse queue). This approach can substantially help improve the network's QoS by ensuring all mouse flows are protected while still preserving its scalability properties.

A main challenge to protect QoS-sensitive mouse flows resides then around the problem of rapid detection of elephant flows so they can be properly isolated from each other. The difficulty in performing such task is once again scalability. In its general form, separating elephant and mouse flows requires measuring the size of each flow, and such task requires per-flow state, which does not scale.

Research on the problem of elephant flow detection has focused on two orthogonal problems. On one hand, there is a need to design scalable data structures to keep track of the necessary flow state. Examples of this line of work include counter arrays (see G. Einziger et al., "Independent counter estimation buckets," in Proc. IEEE INFOCOM, vol. 26, pp. 2560-68, (2015); Y. Li et al., "CASE: Cache-assisted stretchable estimator for high speed per-flow measurement," in Proc. IEEE INFOCOM, vol. 2016-July (2016)), or sketching data structures such as count-min sketch (see G. Cormode and S. Muthukrishnan, "An improved data stream summary: The count-min sketch and its applications," *Journal of Algorithms*, 55(1):58-75, (2005)). Also in this area and more recently, a data structure based on a double hash table that is asymptotically optimal in space and time complexity has been proposed (see R. Ben Basat et al., "Optimal elephant flow detection," in Proc. IEEE INFOCOM (2017)). On the other hand, a second line of research has dealt with the problem of analytical detection, i.e., developing new mathematical models to efficiently infer the set of elephant flows.

Traditional approaches to the analytical problem of elephant flow detection have focused around the identification of key flow-size metrics that are good quality indicators of the presence of large flows. For instance, one technique uses both rate and byte-count thresholds to detect elephant flows (see L. Yi et al., "ElephantTrap: A low cost device for identifying large flows," in Proc. 15th Annual IEEE Symposium on High-Performance Interconnects, HOT Interconnects, pp. 99-105 (2007)). Others have also used metrics such as flow rate (see T. Fioreze et al., "A Statistical Analysis of Network Parameters for the Self-management of Lambda-Connections" Aims, 5637:15-27 (2009) ("Fioreze"), K. C. Lan and J. Heidemann, "A measurement study of correlations of Internet flow characteristics" *Computer Networks*, 50(1):46-62 (2006) ("Lan"), Y. Zhang, et al., "Identifying high-rate flows based on Bayesian single sampling," in Proc. 2010 International Conference on Computer Engineering and Technology (ICCET 2010), vol. 1 (2010) ("Zhang")), duration (see Fioreze, Lan), or burstiness (see Fioreze, S. Sarvotham, et al., "Connection-level analysis and modeling of network traffic," in Proc. 1st ACM SIGCOMM Workshop on Internet Measurement, pp. 99-103 (2001) ("Sarvotham")). One general issue with these metric-based approaches is that they can lead to detection errors, because they provide no mathematically formal way to identify optimal thresholds that work for all traffic distributions.

The problem of scalability by using packet sampling is also addressed in several works. For instance, one technique introduces an elegant low-complexity scheduler that, based on the concept of packet sampling, detects when a flow traversing a network router or switch is likely to be an elephant flow (see K. Psounis et al., "SIFT: A simple algorithm for tracking elephant flows, and taking advantage of power laws," available at http://www.stanford.edu/balaji/ papers/05sifta.pdf (2005) ("Psounis")). Those flows deemed to be elephants, are forwarded to a lower priority queue so that their presence does not deteriorate the QoS of the mouse flows. According to another technique, the idea of packet sampling is generalized to design an elephant trap, a data structure that can efficiently retain the elephants and evict the mice requiring low memory resources. A limitation in these algorithms is that the sampling rate is assumed to be a fixed input. It has been shown, however, that if the traffic is non-stationary, a fixed sampling rate can lead to either false positives (if the sampling rate is too high) or false negatives (if the sampling rate is too low).

The problem of attempting to identify the optimal sampling rate to detect elephant flows has also been addressed in some techniques. For example, based on a Bayesian single sampling method, one technique propose an algorithm that identifies the sampling rate based on user-specified false positive and negative rates (see, e.g., Zhang). This approach, however, requires multiple parameters to be specified including a threshold to classify the elephant flows and assumes the optimal sampling rate is static, which in general does not hold if the traffic is non-stationary.

SUMMARY

To address the challenge of identifying elephant flows efficiently, we describe a technique that takes an information theoretic approach to the problem of elephant flow detection. Specifically, we tackle the question of identifying the minimum amount of information needed to detect the elephant flows with high probability. We discovered that due to the property of heavy tail traffic, it is possible to identify the top largest flows without the need to inspect every single packet. While some techniques provide exact mathematical equations to compute the optimal sampling rate for the correct detection of elephant flows given a target detection likelihood, these equations are shown to be impractical, in that they assume an oracle view with full information of the network's past and future state.

As used herein, an elephant flow is not necessarily the largest but one of the largest flows in a stream of packets received at a network processing node. The size of a flow can be determined using a suitable flow-size metric. The size boundary between the elephant flows and the other flows, also called mouse flows, is not fixed and can vary according to the nature of the network traffic. Thus, in one type of network traffic a flow of size 100 Mb may be properly classified as an elephant flow, while in another type of network traffic, a flow of size 500 Mb may be properly classified as a mouse flow. In some cases, the elephant flows can be distinguished from the mouse flows based on the difference in size of the smallest elephant flow and the largest mouse flow. Here again, the size difference is typically not a specified constant but can be a percentage or a function of the largest flow size, a function of a certain number of the largest flow sizes, a function of a median flow size, etc.

The techniques we describe herein tackle the problem of computing optimal sampling rates from a practical standpoint by using a method of Bayesian inference on a categorical likelihood function based on Dirichlet distribution. While often under-exploited outside the field of statistics, the Dirichlet distribution provides a powerful analytical framework to address the problem of reconstructing the statistical properties of random signals from a limited amount of information.

Specifically, we show that it is possible to accurately estimate the detection likelihood (and thus the optimal sampling rate) using a Dirichlet distribution to construct a prior on the set of $|F|$ or $\gamma$ positive unit-normalized flow size metrics, where F corresponds to the set of flows in the network, and $\gamma \leq |F|$. Our analytical framework enables also the calculation of mathematically proven time convergence bounds, a critical aspect to understand the stability of elephant flow detection algorithms. In particular, we demonstrate our proposed algorithm rapidly converges to the optimal sampling rate at a speed $O(1/n)$, where n is the total number of packets observed, and a significant reduction in the detection error rate compared to state-of-the-art static sampling algorithms.

Accordingly, in one aspect, a method is provided for sampling a stream of packets arriving at a network node at an optimized sampling rate. The sampling rate is determined in an efficient manner, so as to facilitate classification of network flows corresponding to the stream of packets arriving at a network node. The method includes: (a) at a selected sampling rate (e.g., at an initial default rate or a previously updated rate), sampling a packet from the stream of packets arriving at the network node, and (b) for each candidate number of elephant flows (generally denoted $\varepsilon$) in a set of candidate numbers, computing a respective detection likelihood using the sampled packet. The computed detection likelihood is stored in a cache of candidate elephant flows associated with the stream of packets, where the detection likelihood can be updated using additional sampled packets. The method also includes: (c) updating the selected sampling rate according to the one or more detection likelihoods, so that packets can be sampled at an optimized rate. The optimized sampling rate is a rate at which all the elephant flows in the packet stream can be detected accurately, but the sampling rate is not substantially greater (e.g., greater than 1%, 5%, 10%, etc.) than the lowest sampling rate necessary for such a detection. The steps (a) through (c) may be repeated using the updated sampling rate.

In some embodiments, the computation of a detection likelihood for a candidate number of elephant flows is based on pairwise probabilities of relative flow sizes of flow pairs in the cache. To this end, the method includes, for each pair of flows in a cache of flows, updating a pairwise probability of relative flow sizes using flow-size metrics of flows in the pair and the sampled packet. Updating the pairwise probability of relative flow sizes for a pair may include determining whether the sampled packet belongs to a first flow of the pair, or a second flow of the pair, or to neither flow of the pair; and updating the pairwise probability of relative flow sizes for that pair based on the determination. For such an update of a pairwise probability for a certain pair, the method may include selecting, based on the determination of whether the packet belongs to any or neither of the flows in the pair, a Beta distribution based function of positive and negative flow-size metrics. The method may also include computing an adjustment factor using the selected function and the positive and negative flow-size metrics associated with each flow in the pair, and updating the pairwise probability using an adjustment factor.

In some embodiments, updating the pairwise probability of relative flow sizes for a first pair includes determining that a flow-size metric for a first flow in a first pair is the same as a flow-size metric for a first flow in a second pair. The second pair is selected such that: (i) a second flow in the second pair is the same as a second flow in the first pair, and (ii) the pairwise probability for the second pair was updated.

The method may include copying the pairwise probability for the second pair as the pairwise probability for the first pair.

In various embodiments, a flow-size metric includes a positive metric and a negative metric, and the method includes, for each flow in the cache, updating a respective flow-size metrics by incrementing a positive metric associated with the flow, if the sampled packet belongs to the flow and, otherwise, incrementing a negative metric associated with the flow. Updating the selected sampling rate may include decreasing or maintaining the sampling rate, if for at least one candidate number of elephant flows the detection likelihood is greater than a specified threshold and, otherwise, increasing the sampling rate.

The set of candidate numbers of elephant flows may include numbers from one through a number of flows in the cache minus one, i.e., ($\gamma$–1), where $\gamma$ is the number of flows in the cache. In some embodiments, it is determined that for at least one candidate number of elephant flows, the detection likelihood is greater than the specified threshold. In these embodiments, the method further includes identifying a largest candidate number of elephant flows (denoted $\hat{\in}$) for which the detection likelihood is greater than the specified threshold, and designating first $\hat{\in}$ flows in the cache as elephant flows.

In some embodiments, the method includes initializing the cache of flows. To this end, the method includes sampling a number of packets from the stream of packets arriving at the network node at the selected sampling rate, and identifying a flow associated with each one of the sampled plurality of packets. The first detected $\gamma$ flows, or randomly selected $\gamma$ flows after several flows have been detected may be included in the cache of size $\gamma$. Alternatively, the method may include computing a flow-size metric for each identified flow, and including $\gamma$ flows having largest flow-size metrics in the cache. Generally, a total number of flows that are identified or detected is greater than $\gamma$.

The method may include updating the cache by removing a removable flow from the cache when a flow removal condition occurs, replacing in the cache the removed flow with a new flow associated with the stream of packets, and updating pairwise probabilities for all pairs that include the new flow using an initial flow-size metric (e.g. 1) for the new flow. The flow removal condition may be said to have occurred when: (i) a flow-size metric for the removable flow is not updated during a specified time window, or (ii) when a cache update time period has elapsed since a previous cache update, and a flow-size metric for the removable flow is the smallest among flow-size metrics for all flows in the cache.

In some embodiments, to enhance the efficiency of including a new flow in the cache, the cache includes a "ghost" or a dummy flow, i.e., a flow that is not associated with the stream of packets. The flow-size metric for the dummy flow is typically set to the initial flow-size metric. In these embodiments, the method includes updating the pairwise probabilities for all pairs having the new flow, and such an update includes simply designating the dummy flow as the new flow. In these embodiments, the method also includes copying the dummy flow and designating the copy as the dummy flow, which can be used to add yet another new flow.

In various embodiments, the selected sampling rate is updated to a value in a range from 0.000001 up to 1.0. The rate of arrival of the packets in the stream can be in a range from 1 kbps up to 100 Tbps. A particular flow to which a sampled packet belongs may be determined based on one or more of: (i) a pair of source and destination addresses in a header of the sampled packet; (ii) a pair of source and destination port numbers in the header of the sampled packet; (iii) a virtual local area network (VLAN) identifier included in the header of the sampled packet; or (iv) a multiprotocol label switching (MPLS) label included in the header of the sampled packet.

A flow-size metric for a flow may be based on one or more of: (i) a number of packets belonging to the flow at a time of computing the flow-size metric; (ii) a number of bytes belonging to the flow at the time of computing the flow-size metric; (iii) an average number of packets belonging to the flow per unit time; or (iv) an average number of bytes belonging to the flow per the unit time.

In some embodiments, after updating the selected sampling rate, the selected sampling rate is not updated at least for a specified rate adjustment interval. Increasing the selected sampling rate may include increasing the selected sampling rate by a first step size. Decreasing the selected sampling rate may include decreasing the selected sampling rate by a second step size. Two steps sizes are often different but they can be identical. Either or both step sizes themselves can be changed during the detection process.

In another aspect, a system is provided for sampling a stream of packets arriving at a network node at an optimized sampling rate. The sampling rate is determined in an efficient manner, so as to facilitate classification of network flows corresponding to the stream of packets arriving at a network node. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The processing unit may be a part of a networking system, such as a network processor at a node, or can be a part of a network processor.

The instructions in the first memory configure the processing unit to: (a) sample a packet from the stream of packets arriving at the network node, at a selected sampling rate (e.g., at an initial default rate or a previously updated rate), and (b) for each candidate number of elephant flows (generally denoted ε) in a set of candidate numbers, compute a respective detection likelihood using the sampled packet. The instructions also program the processing unit to store the computed detection likelihood in a cache of candidate elephant flows associated with the stream of packets, where the detection likelihood can be updated using additional sampled packets. In addition, the instructions program the processing unit to: (c) update the selected sampling rate according to the one or more detection likelihoods, so that packets can be sampled at an optimized rate. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, sampling a stream of packets arriving at a network node at an optimized sampling rate. The sampling rate is determined in an efficient manner, so as to facilitate classification of network flows corresponding to the stream of packets arriving at a network node. The instructions configure the processing unit to: (a) sample a packet from the stream of packets arriving at the network node, at a selected sampling rate (e.g., at an initial default rate or a previously updated rate), and (b) for each candidate number of elephant flows (generally denoted ε) in a set of candidate numbers, compute a respective detection likelihood using the sampled packet. The instructions also program the processing unit to store the computed detection likelihood in a cache of candidate elephant flows associated with the stream of packets, where the detection likelihood can be updated using additional sampled packets. In addition, the instructions program the processing unit to: (c) update the selected sampling rate according to the one or more detection likelihoods, so that packets can be sampled at an optimized rate. In various embodiments, the instructions can program the processing unit to perform one or more of the method steps described above.

The overall technique that we describe herein differs from various known approaches in that by computing the optimal packet sampling rate, we can capture the top largest flows without the need to specify thresholds regarding flow-size metrics. Our approach is also different in that we develop a mathematical framework to compute the optimal sampling rate and a scalable real time algorithm that dynamically adjusts such rate as the traffic statistical properties change. Our algorithm is robust to false positives and negatives as it also computes in real time the optimal threshold separating the elephants from the mouse flows, with rigorously proven correctness. In addition, in our technique, users can specify a target detection likelihood (instead of the rate of false positives and negatives), the technique does not require any additional parameters or thresholds, as the technique dynamically readjusts the optimal sampling rate on non-stationary traffic.

BRIEF DESCRIPTION OF THE DRAWINGS

Various embodiments of the present invention taught herein are illustrated by way of example, and not by way of limitation, in the figures of the accompanying drawings, in which:

FIGS. 2A-2C show a process that includes three interlinked algorithms for identifying the top elephant flows in a stream of packets, according to various embodiments;

DETAILED DESCRIPTION

Figure 1:
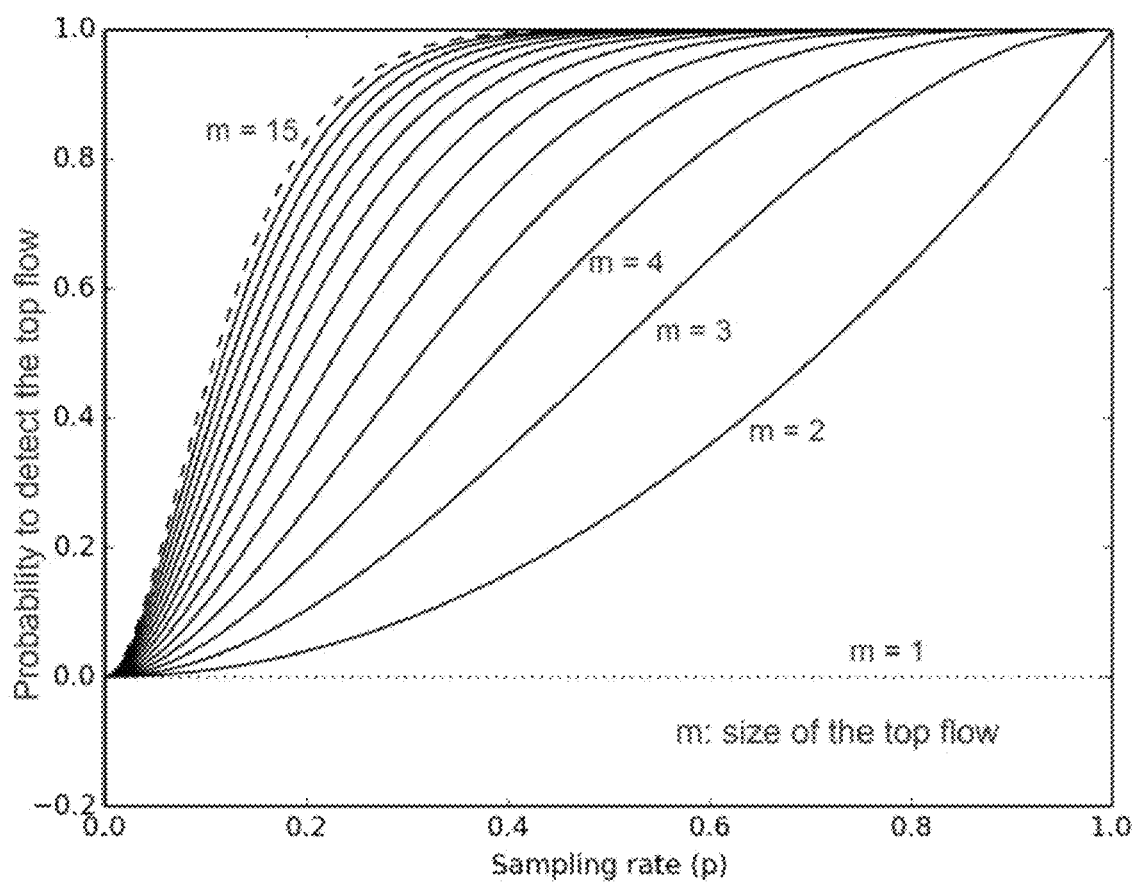
FIG. 1 illustrates examples of top flow detection likelihood, according to some embodiments.

Mathematical Framework
Theory of Elephant Flow Detection Under Partial Information Our mathematical model is based on a framerwork that provides a base theory of elephant flow detection under partial information. This framework is discussed in Applicant's co-pending U.S. patent application Ser. No. 15/834,862, entitled "Systems and Methods for Detecting Large Network Flows" filed on Dec. 7, 2017, (the '862 Application), the entire contents of which are incorporated herein by reference. In the '862 Application, elephant flows were identified using an estimate of the heavy-tailedness of the flows in a stream of packets. The techniques described herein do not compute the heavy-tailedness; rather a scheme of Dirichlet-Categorical inference is employed. In the next paragraphs, we provide a brief summary of this framework needed to understand the model upon which the Dirichlet-Categorical inference method presented in various embodiments is constructed. We start by stating the definitions of quantum error and detection likelihood:

Definition 1:

Quantum error (QER). Let $F=\{f_1, f_2, \ldots, f_{|F|}\}$ be a set of flows transmitting information over a data network and let $n(t)$ be a vector such that its i-th element, $n_i(t)$, corresponds to the size of flow $f_i$ at time t according to some metric (for instance, bytecounts or number of packets). $n(t)$ is therefore a time-varying vector such that $n_i(t_f)=0$ and $n_i(t_l)=\sigma_i$, where $t_f$ and $t_l$ are the times at which the first and the last bit of information are transmitted from any of the flows, and $\sigma_i$ is the size of flow $f_i$ at time $t_l$. Assume without loss of generality that $\sigma_i > \sigma_{i+1}$ and let $F_\varepsilon = \{f_1, f_2 \ldots f_\varepsilon\}$ be the set with the E largest flows according to their size $n_i(t_l) = \sigma_i$ at time $t_l$, for some $\varepsilon \leq |F|$. Finally, let $C_\varepsilon(t)$ be a cache storing the top ε largest flows according to their size $n_i(t)$, $1 \leq i \leq \varepsilon$, at time t. (Hence, by construction, $C_\varepsilon(t_l)=F$.) We define the quantum error (QER) produced by the cache at time t as:

$$e_\varepsilon(t) = \frac{|F_\varepsilon \backslash C_\varepsilon(t)|}{\varepsilon} = \frac{|\{n_i(t) \text{ s.t. } \sigma_i \leq \sigma_\varepsilon \text{ and } n_i(t) > n_\varepsilon(t)\}|}{\varepsilon} \quad (1)$$

Intuitively, the above equation corresponds to the number of top flows that at time t are incorrectly classified as large flows normalized so that the error is 1 if all top ε flows are misclassified. We note that while the assumed model in Definition 1 allows for different metric definitions to measure the size of a flow $n_i(t)$, for the sake of simplicity, in the rest of the discussion we will assume a flow's size corresponds to the number of packets of that flow that have been received and sampled at a network node at the time which the metric is computed or updated.

Other examples of flow-size metric include a number of bytes belonging to the flow at the time of computing the flow-size metric, an average number of packets belonging to the flow per unit time, or an average number of bytes belonging to the flow per the unit time. A flow-size metric for a flow can also include a pair of positive and negative metrics, where the positive metric is associated with the sampled packets that belong to the flow and the negative metric is associated with the sampled packets that do not belong to the flow. The case of variable packet size can be addressed by assigning a sampling probability to each packet proportional to its size.

Definition 2:

Top flow detection likelihood. The top flow detection likelihood of a data network at time t is defined as the probability that the quantum error is zero, $P(e(t)=0)$, i.e., equivalently, that the flow cache at time t captures the top ε flows, $P(C_\varepsilon(t)=F_\varepsilon)$. In other words, the top flow detection likelihood is a probability that all top flows, i.e., the top largest flows have been detected and included in the cache, and that the cache includes only the top largest flows. For the sake of simplicity, we will refer to this probability or the top flow detection likelihood simply as the detection likelihood. The detection likelihood follows a multivariate hypergeometric distribution.

Lemma 1:

Detection under partial information. The detection likelihood of a data network at time t follows a multivariate hypergeometric distribution as follows:

$$P(e_\varepsilon(t)=0) = P(C_\varepsilon(t)=F_\varepsilon) = \sum_{\forall n' \in Z(t)} \frac{\prod_{\forall i}\binom{\sigma_i}{n'_i}}{\binom{\sum_{\forall i}\sigma_i}{\sum_{\forall i} n_i(t)}} \quad (2)$$

where $Z(t)$ is the zero quantum error region, expressed as:

$$Z_\varepsilon(t) = \{n' \in \mathbb{N}^{|F|} | \Sigma_{\forall i} n'_i = \Sigma_{\forall i} n_i(t), n'_i \leq_p \sigma, n'_i > n'_j \forall i, js\cdot t\cdot i \leq \varepsilon, j > \varepsilon\} \quad (3)$$

To illustrate the concept of detection likelihood, FIG. 1 presents the graphs corresponding to Equation (2) for the case in which the traffic distribution has a single large flow of size m and n small flows of size 1. As shown:

For the boundary case m=1, the probability of finding the elephant flow is trivially zero, since the elephant flow is indistinguishable from the small flows.

For m>1 and as we increase the sampling rate p, the probability of finding the elephant flow increases.

As the number of packets in the elephant flow m increases, a lower sampling rate is needed to achieve the same detection likelihood.

The detection likelihood is an important concept because it indicates whether an observer can detect the elephant flows by simple inspection of the flow cache $C_\varepsilon(t)$: if the detection likelihood is high enough, then an observer can be confident the top ε flows in the cache are the actual largest flows. As far as we know, the algorithm we describe herein is the first one to tackle the problem of computing the detection likelihood, which as we will show, enables elephant flow detection with very high precision and efficiency.

Let the sampling rate p be defined as the fraction of data packets observed at time t, $p=\Sigma_{\forall i} n_i(t)/\Sigma_{\forall i} \sigma_i$. Due to Internet traffic's heavy tailed properties, Equation (2) exposes the presence of sampling rates $p_c$ with the following property: for $p>p_c$, the detection likelihood is close to 1; for $p<p_c$ the detection likelihood rapidly decreases to 0. Let sampling rates $p_c$ with this property be denoted as cutoff sampling rates. This observation leads to the following Reconstruction Lemma:

Lemma 2:

Flow ordering reconstruction under partial information. Let $n_i(t)$ be the size of flow $f_i$ at time t assuming that traffic is sampled at a rate p, for $0 \leq p \leq 1$ and $1 \leq i \leq |F|$. Then the following is true:

There exists a cutoff sampling rate $p_c$ such that for any sampling rate $p \geq p_c$, $\tau_i \gg \sigma_j$ implies $n_i(t) \gg n_j(t)$ with high probability.

If the sequence $\{n_1(t), n_2(t) \ldots n_{|F|}(t)\}$ is heavy tailed, then $n_i(t) \gg n_j(t)$ implies $\sigma_i \gg \sigma_j$ with high probability.

If the sequence $\{n_1(t), n_2(t) \ldots n_{|F|}(t)\}$ is not heavy tailed, then either $p<p_c$ or the traffic dataset is not heavy tailed, or both.

Lemma 2 reveals the blueprints of a class of optimal elephant flow detection algorithms. The core idea is to realize that sampling traffic at a rate above $p_c$ leads to no additional benefits since the detection likelihood is already close to 1, while sampling traffic at rates slightly below $p_c$ lead to significant decrease in detection likelihood. This principle implies that detection algorithms should aim at operating at a sampling rate as small as possible but not below $p_c$ to avoid unnecessary samples while detecting elephant flows with high fidelity. We describe herein the first mathematically proven correct dynamic detection algorithm capable of operating at the optimal cutoff sampling rate using a Bayesian inference approach.

Motivation of the Bayesian Inference Approach

Let n(t) be the number of packets observed at time t, then the ratio $$\frac{\prod_{\forall i}\binom{\sigma_i}{n_i(t)}}{\binom{\sum_{\forall i}\sigma_i}{\sum_{\forall i} n_i(t)}} \quad (4)$$

is the probability of observing n(t) at time t assuming the sizes of the flows are $\sigma=\{\sigma_1, \ldots, \sigma_{|F|}\}$. In the framework of Bayesian inference, this is written as $P(n(t)|\sigma)$, which is the likelihood function of our observed data n(t) given the latent flow size variables σ.

There are two roadblocks to the computation of the detection likelihood:

In real world network settings, for a given set of flows F, the calculation of Equation (2) is not possible at time $t<t_e$ because the true flow sizes σ are not known. The flow sizes σ encode prior knowledge of the true future state of the flow distribution. In other words, it assumes an unrealistic oracle view.

Even if one were to know the true σ values, one would have to enumerate and sum over all elements of $Z(t)$, which is combinatorial in size. Thus for realistic networks the calculation of Equation (2) is computationally intractable.

In various embodiments described herein, we solve both of these problems by developing a probabilistic Bayesian framework to compute the detection likelihood by performing inference in the opposite direction. Instead of attempting to find $P(n(t)|\sigma)$ by summing over all possible observations in the zero quantum error region as done in Equation (2), we seek to compute the probability distribution of the flow sizes σ knowing the observation n(t), $P(\sigma|n(t))$, and compute the detection likelihood using the information provided by the resulting posterior distributions over the flow sizes σ. Using this approach, we achieve the two objectives: (1) a priori knowledge of the flow sizes σ is unnecessary and (2) the detection likelihood becomes computationally feasible to calculate. We complete the motivation of our approach by formalizing this concept into a lemma:

Lemma 3:

Lower bound detection likelihood with Bayesian inference. The detection likelihood of a data network at time t in the framework of Bayesian inference of the flow sizes $\sigma_i$ satisfies:

$$P(e_\varepsilon(t) = 0) = P(C_\varepsilon(t) = F_\varepsilon) \geq \prod_{i \in F_\varepsilon, j \in F \setminus F_\varepsilon} P(p_i(t) > p_j(t)) \quad (5)$$

where $p_i(t)$ is the posterior marginal distribution of $\sigma_i$ at time t.

Proof:

Let $x_i$ be drawn according to the distribution $p_i(t)$, for $1 \leq i \leq |F|$. For any $j \in F$ and $k \in F \setminus F_\varepsilon$, let $x_{j,k}$ be the event that $x_j > x_k$. Given our current posterior marginal distributions for two flows, $p_i(t)$ and $p_j(t)$, the probability that we assign to the proposition that $\sigma_i > \sigma_j$ is the same as the probability that $x_i > x_j$, which is $P(p_i(t) > p_j(t))$. Thus, $P(X_{i,j}) = P(p_i(t) > p_j(t))$.

Given a set of flows F, the zero quantum error event, $C_\varepsilon(t) = F_\varepsilon$, corresponds to the state in which all top $\varepsilon$ flows classified as elephants are larger than any of the other flows in F. In other words, $P(C_\varepsilon(t) = F_\varepsilon) = P(\cap X_{j,k})$.

Since $F_E$ and $F \setminus F_\varepsilon$ are disjoint, all the events $X_{j,k}$ are either independent or positively correlated—if one event occurs, it either makes the other events more likely (those that share a mouse flow or elephant flow) or does not affect them (those that do not share any flows in common). When conditioning on multiple events, the effect is additive—for example, given that an elephant flow $x_i$ is greater than several other mouse flows, the probability that it will be greater than another mouse flow increases. More formally, the probability of any of the events conditioned on any subset of the others is greater than or equal to the probability of the event itself.

Thus, $$P\left(\bigcap X_{j,k}\right) = P(C_{1,\varepsilon+1} | X_{1,\varepsilon+2}, X_{1,\varepsilon+3}, \ldots, X_{\varepsilon,|F|}) \cdot$$
$$P(X_{1,\varepsilon+2} | X_{1,\varepsilon+3}, X_{1,\varepsilon+4}, \ldots, X_{\varepsilon,|F|}) \cdot$$
$$P(X_{1,\varepsilon+3} | X_{1,\varepsilon+4}, X_{1,\varepsilon+5}, \ldots, X_{\varepsilon,|F|}) \ldots P(X_{\varepsilon,|F|-1} | X_{\varepsilon,|F|}) \cdot P(X_{\varepsilon,|F|})$$

where we have axiomatically expanded the probability of an intersection of events. However, because the events are positively correlated, conditioning an event on any set of events always keeps equal or increases its probability, so we get:

$$P\left(\bigcap X_{j,k}\right) \geq P(X_{1,\varepsilon+1}) \cdot P(X_{1,\varepsilon+2}) \cdot P(X_{1,\varepsilon+3}) \ldots P(X_{\varepsilon,|F|-1}) \cdot P(X_{\varepsilon,|F|}) =$$
$$\prod_{i \in F_\varepsilon, j \in F \setminus F_\varepsilon} P(X_{i,j}) = \prod_{i \in F_\varepsilon, j \in F \setminus F_\varepsilon} P(p_i(t) > p_j(t))$$

as desired.

Notice that in our formulation above, the only parameter is $\varepsilon$. We show below that the Dirichlet formulation also allow us to compute an optimal value for $\varepsilon$, making our algorithm fully parameterless.

The Dirichlet-Categorical Inference Method

To facilitate the transition towards a Bayesian inference model, we assume that the flow sizes $\sigma$ are normalized to one. In other words, we assume a normalized flow size vector $\sigma$ such that $\Sigma_{\forall i} \sigma_i = 1$. This is clearly sufficient for our desired purpose of determining the relative flow ordering and, as we will see, makes our analysis tractable to techniques that avoid the combinatorial explosion of hypergeometric distributions.

We note that if we have a set of flows in a network of various unknown fixed flow sizes, then sampling a packet from the network corresponds to a probabilistic draw from a categorical distribution. Therefore, asking questions about the distribution of flow sizes has a natural reinterpretation as asking questions about the inferred posterior distribution of the corresponding categorical distribution, given the observed packets so far, n(t). The inferences we draw about the relative ordering of n(t) have a natural bijection that we will use to draw conclusions on the flow orderings of the original flow sizes $\sigma$.

From this insight, it is natural to transform the problem of detecting elephant flows into the language of performing Bayesian inference on a categorical likelihood function, where packets sampled from the network draws from this categorical distribution. Towards this objective, while often under-exploited outside the field of statistics and probability theory, the Dirichlet distribution provides a canonical choice for constructing a prior and enables several elegant properties, including conjugacy with respect to the categorical likelihood function. Because we will use it as the backbone of our method to infer the elephant flows, we formally introduce some of its key properties.

Property 1:

Dirichlet's probability and marginal distributions. The Dirichlet distribution is a probability distribution over the set of categorical distributions with a fixed number of outcomes or classes, denoted by K. It is parameterized by a vector $\alpha = \{\alpha_1, \alpha_2, \ldots \alpha_K\}$, and the support of its distribution is the set of all categorical distributions with K classes. We parameterize this family by the class probability vector $x = \{x_1, \ldots, x_K\}$.

The probability distribution of a Dirichlet distribution parameterized by a given vector $\alpha$ is:

$$Dir(x; \alpha) = \frac{1}{B(\alpha)} \prod_{i=1}^{K} x_i^{\alpha_i - 1} \quad (6)$$

where $B(\alpha)$ is the multivariable Beta function, given by:

$$B(\alpha) = \frac{\prod_{i=1}^{K} \Gamma(\alpha_i)}{\Gamma\left(\sum_{i=1}^{K} \alpha_i\right)} \quad (7)$$

The marginals of a Dirichlet distribution are $$P(X_i = x_i) = B(\alpha_i, \alpha_0 - \alpha_i) \quad (8)$$

where $$\alpha_0 = \sum_{i=1}^{K} \alpha_i.$$

This fact makes it simple to deduce in analytic form the marginals of individual variables in a Dirichlet distribution.

Property 2:

Dirichlet's expectations, variances and covariances. For variables $X_i$, $X_j$ which are distributed according to the marginals of the Dirichlet distribution, their expectations, variances, and covariance are given as follows:

$$\mathbb{E}[X_i] = \frac{\alpha_i}{\alpha_0} \quad (9)$$

$$\text{Cov}(X_i, X_j) = \frac{-\alpha_i \alpha_j}{\alpha_0^2(\alpha_0 + 1)}$$

$$\text{Var}(X_i) = \frac{\alpha_i(\alpha_0 - \alpha_i)}{\alpha_0^2(\alpha_0 + 1)}$$

We discuss below the use of the above property to demonstrate the convergence of our algorithm.

In our setting, we have a flow cache of size $\gamma$ where we store the counts of the top $\gamma$ flows we have observed most often. In general for each flow, a corresponding flow-size metric is stored in the cache and packet count is only one such metric. We refer to the flow-size metric as packet count or count for the sake of simplicity only. Note that in the packet sampling setting, $\gamma \ll |F|$, because we will only see a small portion of the set of the flows in the network. In the Dirichlet framework, K corresponds to the size of this flow cache, $\gamma$, and the class probability vector corresponds to the flow sizes $x=\sigma$.

The Dirichlet distribution provides a likelihood for each possible categorical distribution which the observed samples could have been drawn from. We model our likelihood function such that the sampled packets are drawn from a categorical distribution, with each category associated with a flow, and the probability of each category in proportion to the size of the corresponding flow. Inference of the true flow size distribution is then equivalent to inference of the posterior distribution of the categorical distribution given the observed packets.

More specifically, given a prior $$p(\sigma) = \text{Dir}(\sigma;\alpha) \quad (10)$$

and a set of observations $$n = [n_1, \ldots, n_\gamma] \quad (11)$$

being the counts observed from each flow, the posterior distribution is:

$$p(\sigma|n) = \text{Dir}(\sigma;\alpha+n) \quad (12)$$

This follows from the well known fact that the Dirichlet distribution is conjugate to the categorical distribution. Given this posterior distribution over $\sigma$, the marginal distributions of each flow size $\sigma_i$ with respect to this posterior are:

$$p_i(\sigma_i) = B\left(\alpha_i + n_i, \left(\sum_{i=1}^{\gamma} n_i\right) + \left(\sum_{i=1}^{\gamma} \alpha_i\right) - \alpha_i\right) \quad (13)$$

where we have denoted $p_i$ as the posterior marginal distribution of $\sigma_i$, and where B is the Beta function. This framework therefore provides us with a marginal posterior distribution for the size of each flow. The inferred probability that one flow is greater than another can now be obtained as follows:

$$P(\sigma_i > \sigma_j) = \int_0^1 \left(\int_x^1 p_i(y)dy\right) p_j(x)dx \quad (14)$$

Since the distributions $p_i(\sigma_i)$ and $p_j(\sigma_j)$ are known, Equation (14) is analytically tractable. Further, we also provide very fast algorithms to compute these expressions in an online, streaming manner.

To fully specify the prior, we must choose the initial $\alpha$. We note that setting all of the $\alpha_i$ equal to $$\frac{1}{2}$$

captures Jeffrey's prior, while setting all the $\alpha_i$ equal to 1 corresponds to a uniform prior. Either one guarantees convergence (as shown with reference to Lemma 5). In the experiments that we conducted we use $$\alpha_i = 1, \forall 1 \le i \le \gamma \quad (15)$$

as this has the logical interpretation of assigning all flows a fair initial packet count of 1.

Online Calculation of Pairwise Probabilities

Using the Dirichlet updates from Equation (12), we can deduce the marginal posterior distributions of the flow sizes from Equation (13). Computing the probability that one flow is greater than another is then given by Equation (14). However, (14) is in general computationally expensive and may need to be approximated by numerical methods if implemented naively. In various embodiments, these stochastic inequalities can be computed efficiently, in a streaming manner, and at a high speed, as described below.

To estimate the pairwise probabilities, from Equations (13) and (14) we repeatedly compute $g(a, b, c, d) = P(X > Y)$, where $X = B(a, b)$ and $Y = B(c, d)$ are Beta-distributed random variables. We use the following recurrence relations:

$$g(a+1,b,c,d+1) = g(a,b,c,d) + g_{1,1}(a,b,c,d)$$

$$g(a,b+1,c+1,d) = g(a,b,c,d) + g_{0,1}(a,b,c,d)$$

$$g(a,b+1,c,d+1) = g(a,b,c,d) + g_{0,0}(a,b,c,d) \quad (16)$$

where $$g_{1,0}(a,b,c,d) = \frac{h(a,b,c,d)}{a} + \frac{h(a+1,b,c,d)}{d} \quad (17)$$

$$g_{0,1}(a,b,c,d) = -\frac{h(a,b,c,d)}{b} - \frac{h(a,b+1,c,d)}{c}$$

$$g_{0,0}(a,b,c,d) = -\frac{h(a,b,c,d)}{b} + \frac{h(a,b+1,c,d)}{d}$$

and where $$h(a,b,c,d) = \frac{B(a+c, b+d)}{B(a,b)B(c,d)} \quad (18)$$

In our model, these equations can be interpreted as follows. We initialize all the pairwise probabilities to be $$\frac{1}{2},$$

and assuming a flow cache of size $\gamma$, all the initial Beta distributions are set to $B(1, \gamma-1)$. In other words, we assume we start out having observed one packet from each flow, as specified in Equation (15). As packets are observed, the parameters of the Beta distributions corresponding to these marginals are increased by one in an online manner. Assume a flow $f_i$ is currently distributed as B(a, b). Then upon receiving a new sampled packet, if it belongs to flow $f_i$, its new posterior is set to B(a+1, b), otherwise, its new posterior is set to B(a, b+1). We then use the recurrences in Equation (16) to compute the new resulting pairwise probabilities. These recurrences allow us to calculate the changes in the pairwise probabilities in constant time, which is a key to help scale our algorithm to real-world networks with low latency.

Parameterless Detection of Elephant Flows

To the best of our knowledge, all algorithms found in the literature require using a threshold to delimit the frontier that separates the elephant flows from the mouse flows. Our approach based on the calculation of the detection likelihood under uncertainty, however, provides a formulation to separate both types of flows in a natural manner, without needing any thresholds. Recall from Definitions 1 and 2 that ε corresponds to the true number of elephant flows an oracle would use to compute the quantum error and the detection likelihood. While as non-oracles we cannot know ε, our Bayesian inference framework allows us to make an optimal guess of its value based on our partial information of the state of the network as follows.

Let $\hat{\varepsilon}$ be an estimator of the true value of ε, then we face two cases:
- If $\hat{\varepsilon} < \varepsilon$, then it must be that at least one elephant flow $f_i$ is classified as mouse flow. This necessarily implies that the detection likelihood will not be maximal as it is easy to incur quantum error between any elephant flow and flow $f_i$.
- If $\hat{\varepsilon} > \varepsilon$, then it must be that at least one mouse flow $f_i$ is classified as elephant flow. This necessarily implies that the detection likelihood will also not be maximal as it is easy to incur quantum error between any mouse flow and flow $f_i$.

By reduction, we must conclude that a maximal detection likelihood value is attained when $\hat{\varepsilon} = \varepsilon$ and thus that one can infer the oracle's value of the correct ε parameter using the following equation:

$$\varepsilon \approx \hat{\varepsilon} = \max_{arg(x)} P(e_x(t) = 0) \qquad (19)$$

That is, under the presence of uncertainty and partial information, the optimal set of elephant flows is one that maximizes the detection likelihood equation.

In various embodiments, we use a slight modification of Equation (19) which incorporates additional information provided by a threshold on the detection likelihood, $\text{target}_{dl}$, as shown in Equation (20).

$$\varepsilon \approx \hat{\varepsilon} = \max\{x | P(e_x(t) = 0) \geq \text{target}_{dl}\} \qquad (20)$$

Using the $\text{target}_{dl}$ provides the dual benefits of: (1) refraining from reporting any elephant flows if all detection likelihoods are below $\text{target}_{dl}$, and (2) making sure to classify all elephant flows that are within the required detection likelihood. These benefits reduce the problems of false positives and false negatives, respectively. We note that setting $\text{target}_{dl} = 0$ makes Equations (19) and (20) equivalent. Equation (20) provides us with a natural way to separate elephant flows in a network based on the detection likelihood, and we use it in various embodiments our algorithm as an optimal estimator of ε.

Dirichlet Detection Algorithm

We present the full pseudocode for the Dirichlet detection process in Algorithms 1, 2, and 3, shown in FIGS. 2A-2C, respectively. The core algorithm embedding the mathematical framework is presented as Algorithm 1, process_sample( ). As mentioned, we initialize all pairwise probabilities to 0.5 because our prior assumes that all marginals are initially B(1, γ−1), where B is the Beta distribution. In various embodiments, we also generate a cache of candidate elephant flows, as follows.

We select a sampling rate and begin sampling the packets from the stream of packets received at a network processing node. The initial sampling rate can be selected at random or it can be inversely proportional to a rate of arrival of packets in the stream. For each sampled packet, we determine the flow associated with that packet using generally known techniques. For example, a flow can be identified based on a pair of source and destination addresses in a header of the sampled packet; or a pair of source and destination port numbers in the header of the sampled packet. Alternatively, the flow may be determined according to a virtual local area network (VLAN) identifier or a multiprotocol label switching (MPLS) label included in the header of the sampled packet. Each sampled packet is associated with only one flow, but more than one sampled packets may be associated with a particular flow.

Several, (e.g., tens, hundreds, thousands, hundreds of thousands, or even more) flows may be identified. The size of the flow cache (γ) is typically smaller than the total number of flows that are detected at a certain time. For example, γ can be 8, 20, 64, 250, 1024, etc. Performing the subsequent computations using the flow cache as opposed to performing those computations for all of the detected flow can improve the performance and/or computational efficiency of the detection process. Due to the smaller size of the flow cache, only some of the detected flows are initially included in the flow cache. In some cases, the first γ flows that are detected are included in the flow cache. In other cases, γ flows may be randomly selected from the detected flows for inclusion in the flow cache. In some cases, a flow-size metric (e.g., packet count) is initially computed for each detected flow up to a specified time (e.g., a few micro-seconds, a few milli-seconds, a few seconds, etc.), and the γ flows having the largest metric values at the end of the specified time are included in the flow cache.

Thereafter, a packet is sampled at the selected sampling rate. Per lines 12 to 17 of Algorithm 1, every pair of flows have their pairwise probability updated based on Equation (16). Specifically, a Beta distribution based function of positive and negative flow-size metrics is first selected based on whether the sampled packet belongs to the first flow of the pair, or the second flow of the pair, or to neither the first nor the second flow of the pair. This function is then applied to the positive and negative flow-size metrics for the first and second flows in the pair to obtain an adjustment factor. The previously computed (or the initial) pairwise probability for the pair is then updated using the computed adjustment factor. The vectors a and b are count vectors holding the number of times each flow was seen and not seen, respectively. The values in vector σ may be referred to as the positive flow-size metric values, and the values in vector b may be referred to as the negative flow-size metric values. These vectors are updated based on the packet that was just sampled, per lines 18 to 21.

Once the pairwise probability a and b are all updated, function calculate_detection_likelihoods( ) is called. In this function, shown as Algorithm 3, the detection likelihoods are calculated for all ε, $1 \leq \varepsilon \leq \gamma - 1$, minimizing redundant computations. The quantity ε represents the candidate number of elephant flows. Theoretically, the cache should include all of the elephant flows and no mouse flows. To ensure, however, that no elephant flow is missed, the cache should also include one, but only one mouse flow. As such, ε=γ−1 represents the best-case scenario, where ε is the number of elephant flows the algorithm would report. In order to determine ε, each candidate number of elephant flows, i.e., each ε in the range from 1 through γ−1 is tested. The rationale behind these calculations is provided by Lemma 3, which establishes that the products calculated by Algorithm 3 are lower bounds on the detection likelihood.

In the function choose_ε_and_adjust_sampling_rate( ), shown in Algorithm 3, lines 3 to 5 implement the estimator for ε using Equation (20). To ensure our choice is correct within the required accuracy target, we only select a valid value for ε if the detection likelihood is above the target detection likelihood $target_{dl}$. The value of $target_{dl}$ can be very high, e.g., 99.99%, 95%, 90%, etc., or lower, such as 85%, 80%, etc. If an ε exists for a specified $target_{dl}$, we decrease the sampling rate, as this means we have sufficient information to make a decision about the identities of the elephant flows, and we can try reducing the sampling rate to test whether we can still have enough information at a lower rate. If no such ε exists, then we currently are not receiving enough information at our sampling rate, so we increase the sampling rate to increase the information we receive in future iterations. Importantly, if there is no ε with a detection likelihood above the target, then we do not report the number of elephant flows, because we have not reached our desired level of confidence to make a decision. This is an important feature of our algorithm which differentiates it from other known algorithms, and significantly reduces the quantum error rate of our algorithm, minimizing false negatives and false positives, as we show below through real network benchmarks.

In general, the rate of arrival of packets in a stream can range from 1 kbps up to 100 Tbps, and the sampling rate may updated to a value in the range from 0.000001 up to 1.0. A sampling rate of 0.000001 implies that one out of 1,000,000 packets would be samples and a sampling rate of 1.0 implies that each arriving packet would be sampled. The sampling rate may be updated in steps. One step size may be used while increasing the sampling rate while another step size may be used while decreasing the sampling rate. The step size(s) can range from 0.000001 up to 0.1. In some cases, the same step size can be used for both increasing and decreasing the sampling rate. In successive updates, the step size(s) can themselves be increased or decreased, and the change in the step size(s) can be linear or non-linear. In some cases, once the sampling rate is updated, that rate is not updated further at least for a specified rate adjustment interval such as a few microseconds, a few milliseconds, etc. In other words, the sampling rate update is suspended for the specified rate adjustment interval Computational Complexity and Time Convergence We now formally analyze both the computational complexity and the time convergence of our algorithm.

Lemma 4:

Computational Complexity. The total cost of the Dirichlet detection algorithm is $O(\gamma^2)$.

Proof:

The evaluation of the function h from Equation (18) takes constant time, and each pairwise probability update takes two calls to h, so they each take constant time as well. There are $O(\gamma^2)$ pairs of flows to compare. Next, for the detection likelihood calculation, there are $O(\gamma)$ detection likelihoods that need to be calculated and each takes $O(\gamma)$ time. Passing through the detection likelihoods in Algorithm 3 to choose the best ε takes $O(\gamma)$ time. Thus in total, our algorithm is $O(\gamma^2)$.

Note that since we are sampling packets at a small rate, the number of unique flows γ we see is typically significantly smaller than the total number of flows in the network |F|, γ<<|F|. This ensures the scalability of the detection algorithm. It also increases the performance of the detection process, and decreases the memory footprint (size of the required memory) of the process, and/or the computational resources required to perform the detection. Additional speedup optimizations are described below.

Lemma 5:

Order of Time Convergence. As the number of the packets observed n increases, under the assumption of expected asymptotic behavior, the probability of our algorithm misclassifying any flow goes to 0 at a rate of $$O\left(\frac{1}{n}\right).$$

Proof:

Suppose that after the observation of a set of packets, the posterior Dirichlet distribution is $Dir(\alpha_1, \ldots, \alpha_\gamma)$, and let $$\alpha_0 = \sum_{i=1}^{\gamma} \alpha_i.$$

Since our algorithm begins with a prior of $Dir(1, \ldots, 1)$, $\alpha_0$ begins at γ and therefore at any point after seeing n samples, $\alpha_0 = n + \gamma$.

Then from Equation (9), $$\begin{aligned}
\operatorname{Var}(\sigma_i - \sigma_j) &= \operatorname{Var}(\sigma_i) + \operatorname{Var}(-\sigma_j) + 2\operatorname{Cov}(\sigma_i, -\sigma_j) \\
&= \operatorname{Var}(\sigma_i) + \operatorname{Var}(\sigma_j) - 2\operatorname{Cov}(\sigma_i, \sigma_j) \\
&= \frac{\alpha_i(\alpha_0 - \alpha_i)}{\alpha_0^2(\alpha_0 + 1)} + \frac{\alpha_j(\alpha_0 - \alpha_j)}{\alpha_0^2(\alpha_0 + 1)} + \frac{2\alpha_i \alpha_j}{\alpha_0^2(\alpha_0 + 1)}
\end{aligned} \qquad (21)$$

Let $$r_i = \mathbb{E}(\sigma_i) = \frac{\alpha_i}{\alpha_0}$$

and $r_j$ be defined likewise. Under the assumption of expected asymptotic behavior, we substitute $$r_i = \frac{\alpha_i}{\alpha_0}$$

and $$r_j = \frac{\alpha_j}{\alpha_0}$$

in the formula for Var($\sigma_i-\sigma_j$) to obtain:

$$\text{Var}(\sigma_i - \sigma_j) = \frac{r_i(1-r_i) + r_j(1-r_j) + 2r_ir_j}{\alpha_0 + 1} = \frac{s_{ij}}{\alpha_0 + 1} \quad (22)$$

where we have let $$s_{ij} = r_i(1-r_i) + r_j(1-r_j) + 2r_ir_j \quad (23)$$

The probability that we misclassify the ordering of flows i and j is the probability that our algorithm assigns to $P(\sigma_j > \sigma_i) = P(\sigma_i - \sigma_j < 0)$. By Chebyshev's inequality, $$P(\sigma_i - \sigma_j < 0) \quad (24)$$

$$= P((\sigma_i - \sigma_j) - (r_i - r_j) < -(r_i - r_j)) \quad (25)$$

$$< \frac{\text{Var}(\sigma_i - \sigma_j)}{\text{Var}(\sigma_i - \sigma_j) + (r_i - r_j)^2} \quad (26)$$

$$= \frac{s_{ij}/(\alpha_0 + 1)}{s_{ij}/(\alpha_0 + 1) + (r_i - r_j)^2} \quad (27)$$

$$= \frac{s_{ij}}{s_{ij} + (r_i - r_j)^2(\alpha_0 + 1)} \quad (28)$$

$$< \frac{s_{ij}}{(r_i - r_j)^2(\alpha_0 + 1)} = \frac{s_{ij}/(r_i - r_j)^2}{\alpha_0 + 1} = \frac{T_{ij}}{\alpha_0 + 1} \quad (29)$$

where we have let $$T_{ij} = \frac{s_{ij}}{(r_i - r_j)^2} \quad (30)$$

The total detection likelihood is the probability that we don't misclassify any of the pairwise comparisons between elephant flows and mouse flows. By the union bound, this is bounded by the sum of the probabilities of these pairwise miscomparisons. Thus, the probability of any misclassification (equivalently, the complement of the detection likelihood), is bounded by:

$$\sum_{i \in E} \sum_{j \in M} \frac{T_{ij}}{\alpha_0 + 1} \quad (31)$$

Recall that $\alpha_0 = n + \gamma$. Thus, as the number of packets observed n increases, the probability of failure goes to 0 at a rate of $$o\left(\frac{1}{n}\right).$$

Methods and Implementation

The implementation of the algorithm in different embodiments features optimizations that can increase the performance/speed of the algorithm and efficiency thereof in terms of memory, computational resource, and/or energy/power requirements, and allow the algorithm to scale to real-time network traffic, with low latency.

Unique Count Optimization

Each pairwise probability update between flows $f_i$ and $f_j$ depends only upon the Dirichlet parameters for each flow, $\alpha_i$ and $\alpha_j$. Thus, once a flow $f_i$'s pairwise probabilities with respect to all other flows have been updated, any other flow $f_j$ such that $\alpha_j = \alpha_i$ will have the same pairwise probability updates. Thus, to update the pairwise probabilities for $f_j$ we simply copy the updates from $f_i$. This reduces the complexity of the pairwise probability updates from $O(|\gamma|^2)$ to $O(|\{\alpha\}|)^2$, where $\{\alpha\}$ is the set of coefficients of $\alpha$, and $|\{a\}|$ is the number of unique elements of $\alpha$. Because real-world traffic distributions tend to follow a power law distribution, a majority of flow counts will be concentrated in a few small numbers<10, and this optimization leads to a significant increase in process sampling speed.

Ghost Flow Handshake

In real networks, flows come into and out of existence dynamically. It is thus imperative that we can incorporate both events into our algorithm. To account for flows ending, we implemented a timekeeping mechanism which detects when a flow times out. In particular, a removable flow may be removed from the cache when that flow times out, i.e., a flow removal condition occurs. The removed flow is typically replaced with a new flow associated with the stream of packets. The pairwise probabilities for all pairs that include the new flow may be updated using an initial flow-size metric (e.g., 1) for the new flow. A flow removal condition may be said to have occurred with respect to a removable flow when a flow-size metric for the removable flow is not updated during a specified time window (such as a few microseconds, a few milliseconds, a few seconds, etc., since the last update to the flow-size metric for that flow). In some cases, a removal condition is said to have occurred when a cache update time period (e.g., a few microseconds, a few milliseconds, a few seconds, etc.) has elapsed since a previous cache update, and a flow-size metric for the removable flow is the smallest among flow-size metrics for all other flows in the cache.

When a flow removal condition occurs for a flow, that flow is deleted from the a and b vectors, and the corresponding row and column in p are deleted as well. The problem of a new flow coming into existence poses a unique challenge. We note that a naive implementation of adding the flow to a, b and p, and calculating all the pairwise probabilities when adding to p would lead to a large delay because the method for computing pairwise probabilities is a recursion, and hence scales with the total number of packets observed.

To resolve this problem, we store an extra "ghost" (also called a dummy) flow in our a, b and p data structures, and we keep the observed count of this flow to be 1. We then update this ghost flow's pairwise probabilities in the p matrix as normal. When a new flow is observed, we make a copy of this ghost flow, and then assign the new flow to the original ghost flow. Thus, the new flow will incorporate all the up-to-date computed probabilities of the ghost flow, and the copy of the ghost flow will be available to incorporate additional flows. This technique amortizes the cost of adding new flows into the streaming calculation and ensures that our algorithm has low variance in the time taken to compute the pairwise probabilities of a sampled packet, regardless of whether it is from a new, unobserved flow or not.

Static Sampling Implementations

As described above, our algorithmic framework based on Dirichlet-Categorical inference provides two new features with respect to the state-of-the-art: (1) the ability to compute an optimal sampling rate that is as small as possible while ensuring all the elephant flows are captured in the flow cache, and (2) the ability to estimate the detection likelihood and thus know the level of accuracy of the current estimation. In many network measurement scenarios, the sampling rate is fixed. For instance, the sFlow protocol normally operates using a static sampling rate defined by the network operator. If the sampling rate is fixed, there is no need to attempt to compute a dynamic optimal sampling rate, but our algorithm can still be very useful in these scenarios as it provides a mechanism to eliminate quantum error by using the detection likelihood.

Indeed, in the problem of elephant flow detection, uncertainty comes from two sources: (1) the inability to capture all network traffic at line rate, which requires sampling of the traffic, which leads to information loss, and (2) the inability to know the future performance of each flow. Hence, there are two ways by which uncertainty can be reduced: (1) by increasing the sampling rate to inspect more packets, or (2) by delaying the detection decision until more packets are collected. In the cases where the sampling rate is static, there is no need to identify the optimal sampling rate but there is still a need to identify the optimal time the algorithm needs to wait until an accurate detection decision can be made. It is in this regard that the computation of the detection likelihood provides a key piece of information to reduce noise/errors in the detection process. In summary, if the sampling rate is static, our technique still provides value to the network operator as it helps determine at which point in time the detection likelihood is high enough that a classification decision can be made with a quantifiable probability of error given by the complement of the detection likelihood $1-P(e(t)=0)$.

An Alternative Approach

In another technique for computing the detection likelihoods, the pairwise probabilities are not computed. The method of Dirichlet-Categorical inference provides a posterior distribution over the set of all possible categorical distributions from which the observed count sizes (flow-size metrics, in general) are drawn. We define a categorical distribution to "k-agree" with the observed flow counts if the top k flows in the observed flow counts are also the top k flows in the categorical distribution. The detection likelihood can then be computed by observing that the detection likelihood for k elephant flows is the total probability that the true categorical distribution is in "k-agreement" with the observed flow counts.

Suppose the flow size variables ordered by flow counts are $x_1, x_2, \ldots, x_n$. Then the set of categorical distributions in "k-agreement" with the observed flow counts is defined by the simplex with boundaries:

$$x_1 > x_{k+1}, x_1 > x_{k+2}, \ldots, x_1 > x_n$$

$$x_2 > x_{k+1}, x_2 > x_{k+2}, \ldots, x_2 > x_n$$

$$\ldots$$

$$x_k > x_{k+1}, x_k > x_{k+2}, \ldots k > x_n$$

In other words, the boundaries of the integration are defined by all inequalities of the form $x_i > x_j$, where $1 <= i <= k$ and $k+1 <= j <= n$. By integrating the current posterior Dirichlet distribution (given by Equation (6)) over the simplex defined by these inequalities, we can compute the detection likelihood for the top k flows. Such an integration can be perform using known numerical integration techniques.

Results

Synthetic Data

In our first set of experiments our objective was to empirically validate how closely the Dirichlet inference framework tracks the true oracle equations. Towards this goal, we measured the detection likelihood computed by our algorithm on categorical draws from some well-known analytic distributions: Gaussian, Laplace, Cauchy, Sech-Squared, and Linear. The flow size equations for each distribution are presented in Table 1. In our simulations, flows generated a number of packets according to each distribution, rounding the number to integers by taking the ceiling.

TABLE 1

Analytic forms of synthetic traffic distributions. $\tau_i$ is chosen such that $$\sum_{i=1}^{\gamma} \tau_i = 300,$$

and the distributions are shown in order of increasing entropy.

| Gaussian | Laplace | Sech-square | Cauchy | Linear |
|---|---|---|---|---|
| $\tau_i e^{-\frac{1}{2}i^2}$ | $\tau_i e^{-i}$ | $\dfrac{\tau_i e^{-i}}{(1+e^{-i})^2}$ | $\dfrac{\tau_i}{1+i^2}$ | $\tau_i(\gamma - i)$ |

We implemented and executed an embodiment of Algorithms 1-3 for the number of flows in the cache, $\gamma$, equal to 10 and 100, and the detection likelihood was calculated for $\varepsilon=2, 3, 4,$ and 5. The results of the runs for $\gamma=10$ and $\gamma=100$ are respectively shown in FIGS. 3A-3D and in FIGS. 4A-4D, for each of the 5 traffic distributions shown in Table 1.

We first tested the results against Lemma 2. Since there is a linear correspondence between the sampling rate p in Lemma 2 and the number of samples observed n shown in FIGS. 3A-3D and 4A-4D, we will use them interchangeably. The first statement in Lemma 2 tells us that for a heavy tailed distribution, there must be a number of samples $n_c$, analogous to $p_c$, such that the detection likelihood is high at $n_c$ onwards, and is smaller before $n_c$. It is clear from FIGS. 3A-3D and 4A-4D that, for the heavy tailed traffic distributions, there is a cutoff value $n_c$, analogous to $p_c$ in Lemma 2, at which the detection likelihood rapidly approaches its maximum, and additional samples do not significantly increase the detection likelihood further, just as Lemma 2 predicts.

The second bullet point in Lemma 2 tells us that if our observed flow counts are heavy tailed, then the true flow distribution likely is as well. We quantify the extent to which a distribution is heavy tailed by measuring its entropy. In FIGS. 5A-5D, we plot the entropy of the posterior Dirichlet distribution for each input traffic distribution, for $\gamma=10, 40, 100,$ and 200. We see that the entropies of the Dirichlet posteriors are in the same order as the entropies of the respective input distributions, which is given in Table 1. Thus, for an input distribution which has lower entropy (more heavy tailed), our posterior distribution has lower entropy, meaning that our algorithm is more certain. FIGS. 3A-3D and 4A-4D also show that the time to convergence follows this same order as well, with Gaussian being the fastest to convergence, followed by Laplace, then Sech-Square, then Cauchy and ending with Linear. This result based on the Dirichlet inference model is precisely in agreement with the oracle equations.

Next, the third bullet point would lead us to expect that if our observed samples are not heavy tailed, then we should be less certain about deciding upon a certain flow ordering, and instead wait and observe more samples. This behavior can indeed be seen in the Linear detection likelihood in FIG. 3A. Although we were able to deduce that $\sigma_1$ is the largest flow for the Gaussian distribution by iteration 25, it took roughly 3000 iterations to conclude the same for the Linear distribution. Since the Linear distribution is not a heavy tailed distribution, this is precisely the expected behavior. The above analysis provides empirical evidence that the Dirichlet inference framework is capable of qualitatively following the oracle equations and the Reconstruction Lemma under the presence of uncertainty and partial information.

Figure 3A:
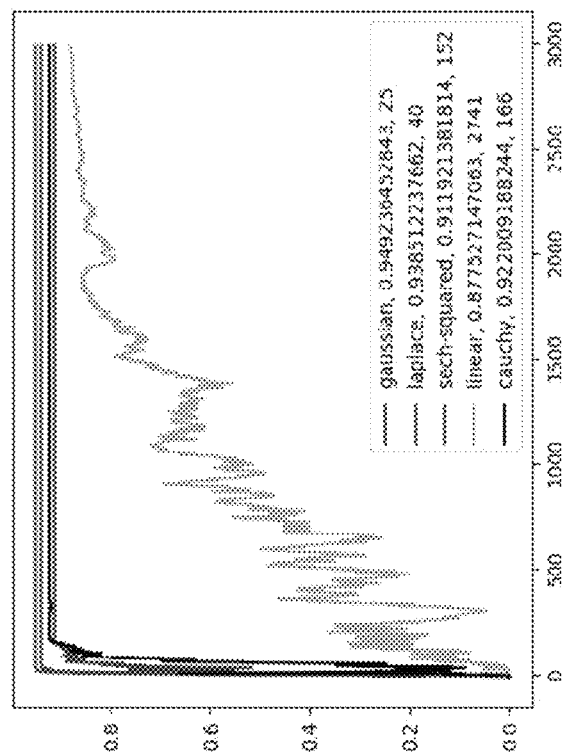
Figure 3D:
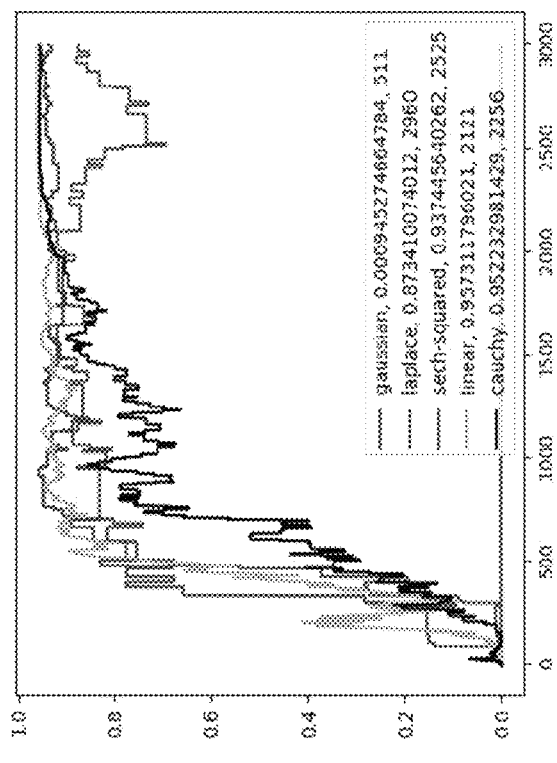
Figure 3C:
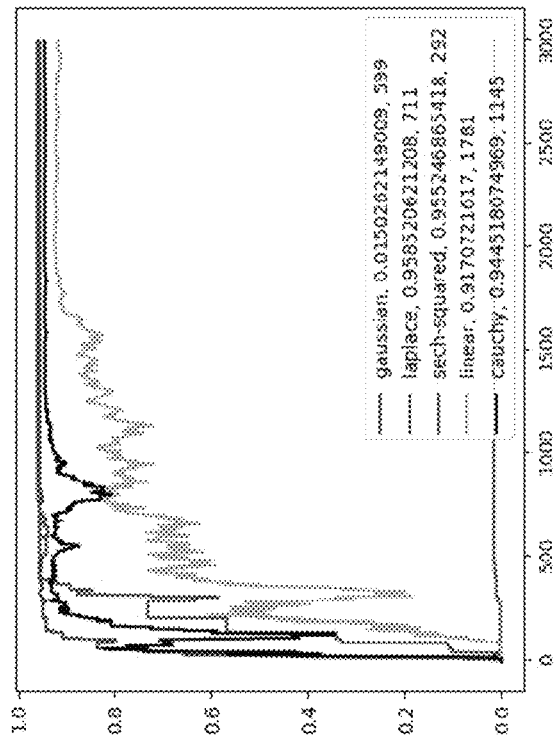
Figure 4A:
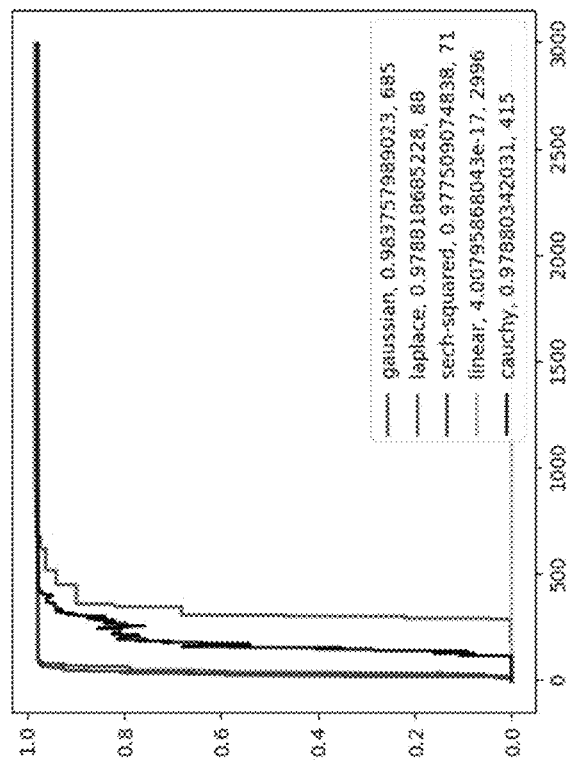
FIGS. 4A-4D show, for network flows according to five distributions, the detection likelihood corresponding to the numbers of elephant flows from 2 to 5, where the detection likelihood was computed using an embodiment in which the flow cache size is 100.

The experiments help also to empirically validate the accuracy of the estimator P according to Equation (20). Consider for example the Gaussian distribution, for which the equation in Table 1 corresponds to the flow size distribution [242, 54, 5, 1, 1, 1, 1, 1, 1, 1, . . . ]. Note, in our experiments we rounded the flow sizes to integers by taking the ceiling. As shown in FIGS. 3A and 4A, our algorithm quickly identifies the first two elephant flows by iterations 25 and 49 for the cases of $\gamma=10$ and $\gamma=100$, respectively. With the given limited information received up until that point, the Dirichlet method tells us also that the top 2 elephant flows captured in the cache ($\hat{\varepsilon}=2$) correspond to the true top two largest flows with a probability of 94.9% for $\gamma=10$ and 98.4% for $\gamma=100$.

Figure 3B:
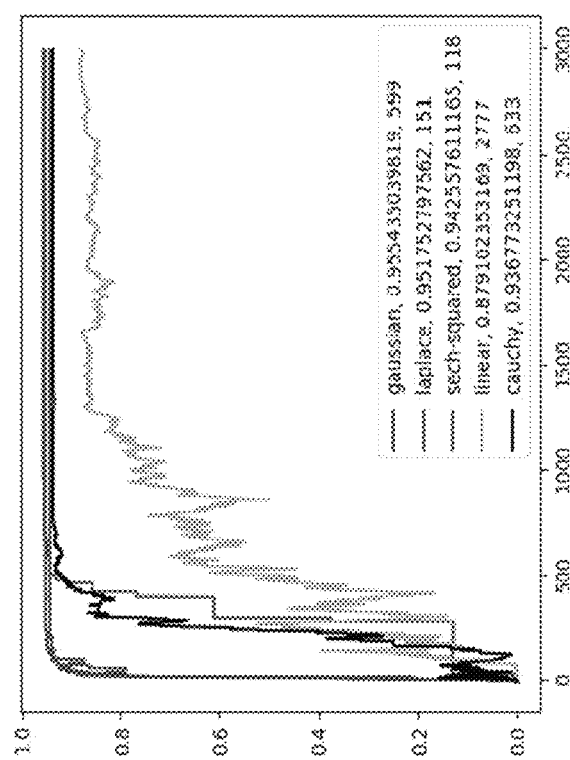
FIGS. 3A-3D show, for network flows according to five distributions, the detection likelihood corresponding to the numbers of elephant flows from 2 to 5, where the detection likelihood was computed using an embodiment in which the flow cache size is 10.
Figure 4B:
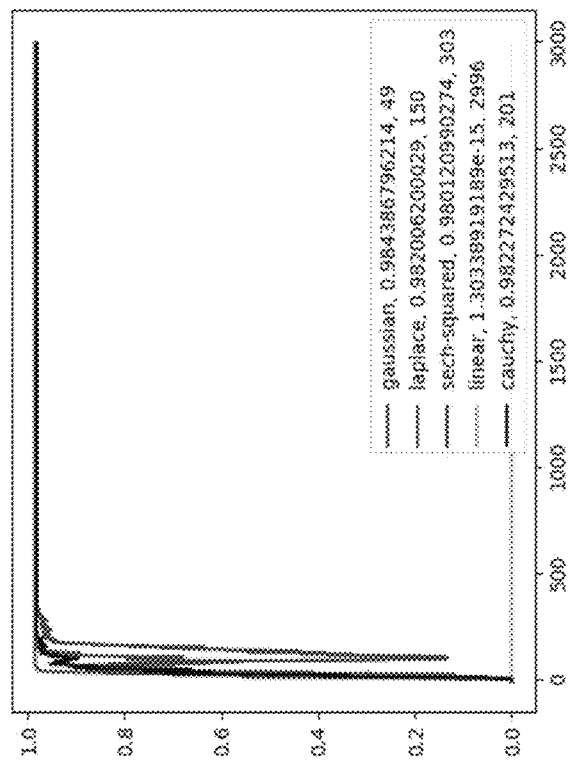
Figure 4D:
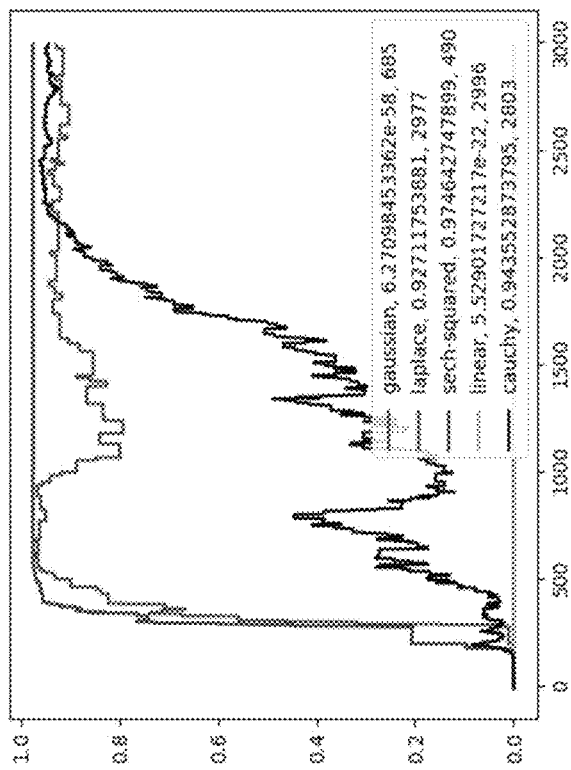
Figure 4C:
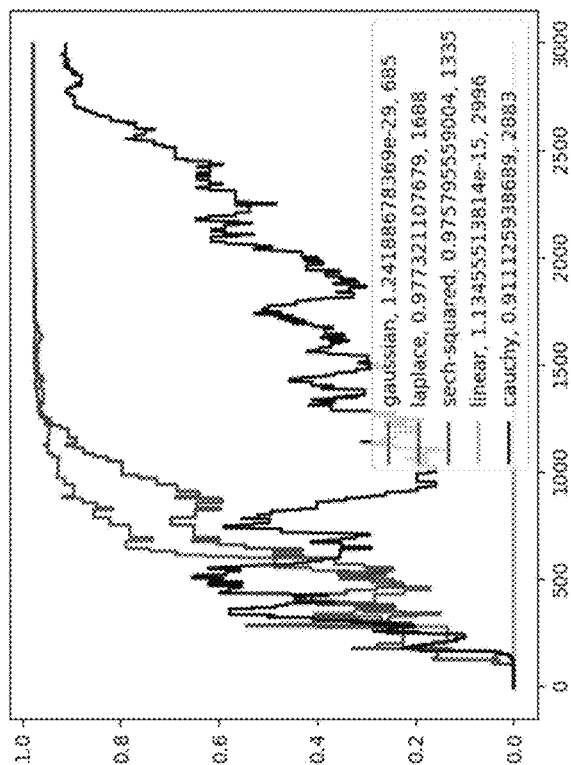
Figure 5A:
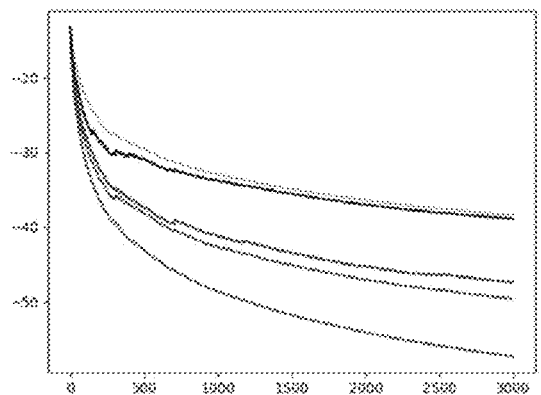
FIGS. 5A-5D depict the entropys of the posterior Dirichlet distribution for five different input traffic distributions, for different flow-cache sizes.
Figure 5B:
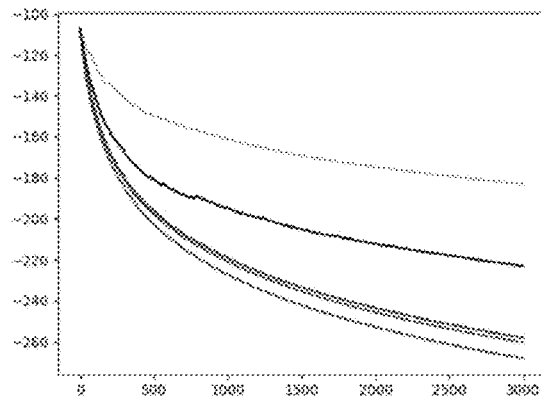
Figure 5C:
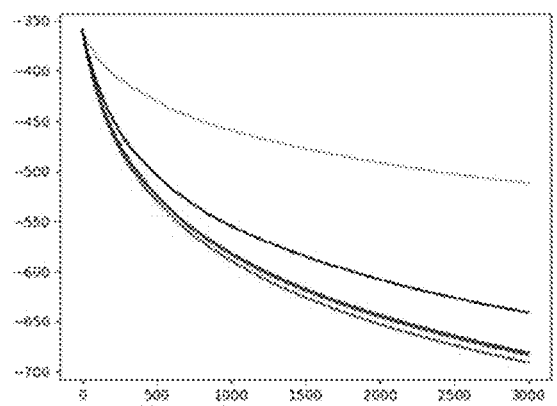
Figure 5D:
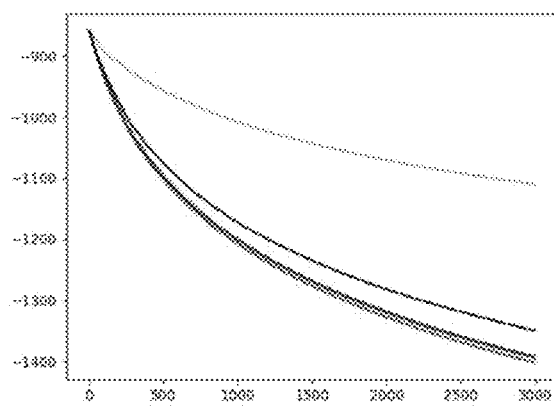

If we wait to collect a bit more information, then from FIGS. 3B and 4B, we detect a third elephant flow with a detection likelihood of 95.5% and 98.3% at iterations 599 and 685, respectively. However, notice that the Gaussian curve for the cases $\varepsilon=4$ and $\varepsilon=5$ stay flat near zero. Thus the algorithm is able to correctly infer that there exists no more than 3 elephant flows (since the probability of that being the case drops to zero as soon as we switch $\varepsilon$ from 3 to 4). Using Equation (20), our estimator $\hat{\varepsilon}$ is able to identify the right number of elephant flows by choosing at every point in time the value of $\varepsilon$ that maximizes the detection likelihood.

Network Data

In our second set of experiments, the main objective was to test our algorithm in a real SDN networking environment and against some of the other detection algorithms considered state-of-the art. To this end, we built an SDN test lab using Open vSwitch (OVS) for network engineering and Linux KVM for virtualization of hosts of our simulated network. The server hosting the nodes of the network had 2 Xeon E5-2670 CPUs for a total of 32 cores and 64 GB of RAM. A base KVM hypervisor was used to virtualize the complete SDN test lab, and inside the base KVM, we used (1) OVS to build arbitrary configurations of SDN-capable network topologies and (2) another layer of (nested) KVMs to create arbitrary numbers of VM hosts used as sources and sinks in the SDN network. Our simulated network had two nodes and one virtual switch between them, and packets were sampled from this switch while traveling from the source node to the sink node using sFlow, a well-known standard protocol used to monitor networks using packet sampling.

We implemented a controller that talks with the OVS switch to control the sFlow sampling rate in real time and connected the controller to our implementation of the Dirichlet detection algorithm. Our simulated traffic alternated every 30 s between a traffic distribution with five elephant flows, and another disjoint traffic distribution with ten elephant flows, to determine how our algorithm adjusts to changes in the network's traffic distribution. The two distributions did not share any flows in common.

Our main objective is to demonstrate our claim about the importance of both using dynamic sampling rate and inferring the detection likelihood in order to detect elephant flows with accurate precision in dynamic real world networks. To the best of our knowledge, none of the existing, known methods (such as the Elephant Trap, SIFT, and BSS, among others) are capable of computing in real time the optimal sampling rate or inferring the detection likelihood. It is important to note that while we demonstrate below the performance benefits of using the Dirichlet detection algorithm, embodiments according to our technique can be used as a standalone probabilistic building block to enhance any of the existing algorithms and techniques.

Figure 6:
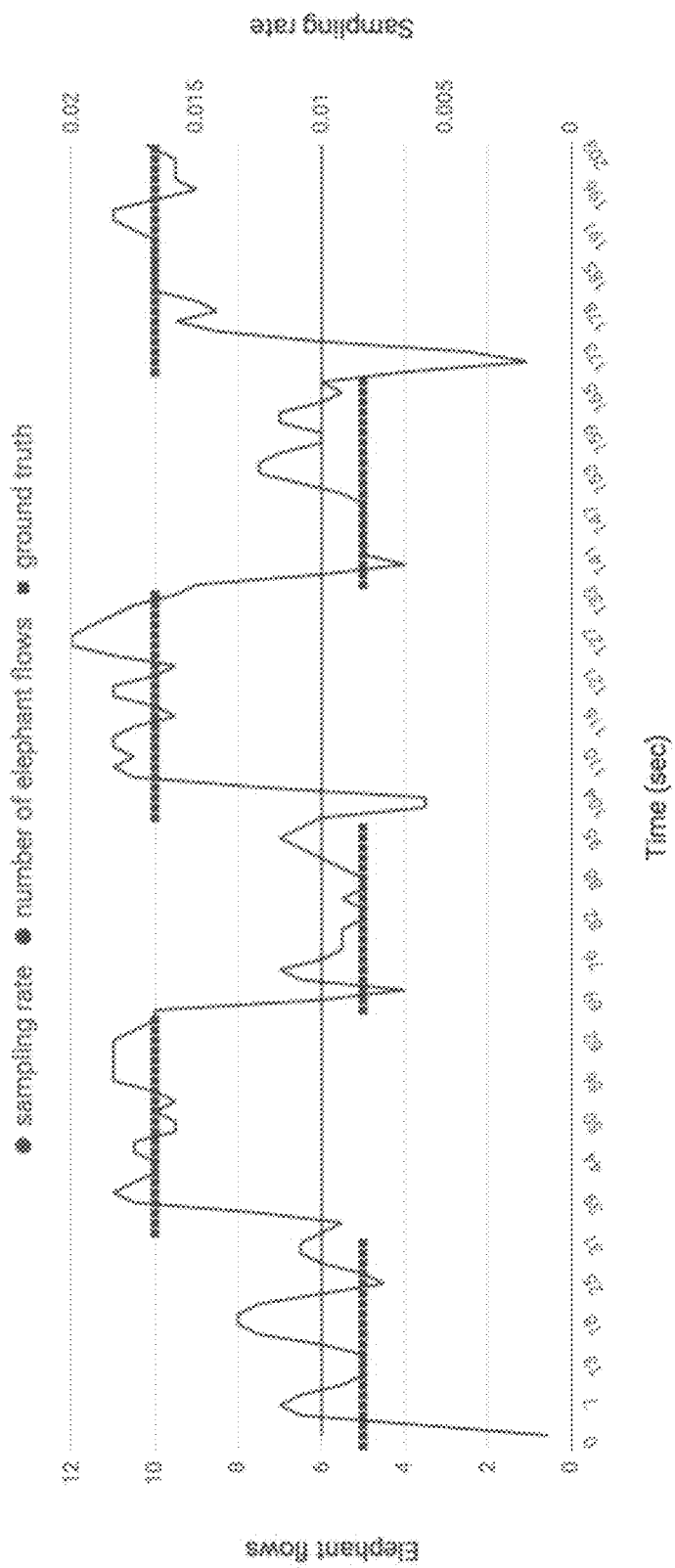
FIG. 6 shows the number of elephant flows detected using an embodiment where the sampling rate is not allowed to be updated.

As a benchmark to determine the benefits of our technique, we first tested the performance of a static sampling approach as is done in today's sampling rate-based detection algorithms. In particular, for this base benchmark we used an arbitrary static sampling rate of 0.01. Note however, that the following results are applicable to other static sampling rate values. The results for static sampling rate are shown in FIG. 6. The algorithm fluctuates rapidly, hovering around the ground truth number of elephant flows. Since the algorithm is not situated within a rigorous probabilistic framework, it cannot infer the certainty with which it reports its classifications. This leads to a non-zero quantum error rate, including both false negatives and false positives, with the algorithm reporting these errors without regard to any inherent uncertainty. Note that all static sampling algorithms which are not placed within a probabilistic framework suffer from the same problems.

Naturally, a problem with the static sampling rate framework is that the particular choice of the sampling rate is critical. More problematic also is that this choice implicitly encodes an a priori decision regarding the definition of an elephant flow. Assumptions on the size of an elephant flow, such as being more than 10% of the link capacity, may be used for probabilistic justifications to bound the probability of error. However, real world network traffic varies widely and the optimal threshold for elephant flows does so as well. This has important ramifications for classification of real world network traffic, because the definition of elephant flow changes our optimization objective, which then affects the QoS. We reason that this is the wrong direction—the QoS requirements should inform our definition of elephant flows, and hence our algorithm, in various embodiments, makes fewer assumptions on the definition of elephant flows, and is thus capable of handling a wider variety of traffic.

Figure 7:
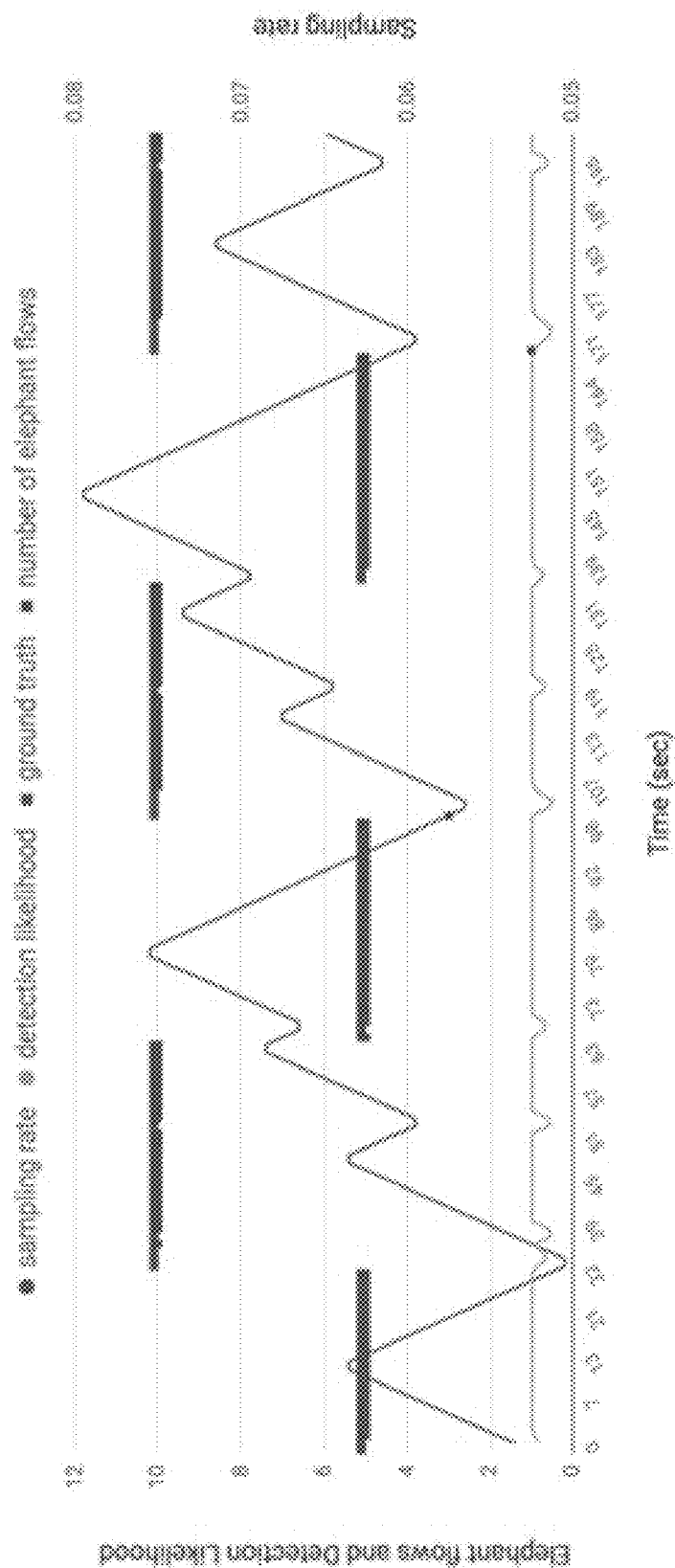
FIG. 7 shows the number of elephant flows detected using an embodiment where the sampling rate is allowed to be updated.

In FIG. 7, we present the result of our algorithm in the same setting, but when the algorithm is allowed to update the sampling rate. The algorithm reports the correct ground truth number of elephant flows with high detection likelihood for all time points except two. The sampling rate, shown in blue, fluctuates from 0.05 to 0.08, and increases or decreases based on the detection likelihood. The algorithm is able to maintain a detection likelihood close to one for a large portion of the time, while it successfully stays at the minimum necessary rate to receive enough information to properly classify the elephant flows.

Importantly, in the time periods where the plot of ground truth (shown in red) does not overlap with the plot of our algorithm's elephant flow classification (shown in green) our algorithm refrained from reporting the number of elephant flows, because the detection likelihood was below the target. For example, at the beginning of each shift in the traffic distribution, the detection likelihood dips and the algorithm stops reporting any elephant flow classification, just as desired. This leads to a reduction in quantum error rate, and summarizes one important contribution of the detection likelihood based method achieved by the probabilistic framework of Bayesian inference: its capability to understand its own limitations, refraining from making detection decisions when they are likely to be erroneous.

To quantify the degree of accuracy achieved by both methods, we calculated the average quantum error using Equation (1), averaged over the entire test time. The average quantum error for the static sampling benchmark and our algorithm are 0.19844 and 0.00893, respectively, and thus for the performed test our algorithm achieves a reduction in average quantum error by roughly a factor of 22.

Thus, in various embodiments we have introduced a new mathematical framework for the detection of elephant flows and presented an algorithm within this framework using the theory of Bayesian statistics. This algorithm is fully parameterless, uses dynamic sampling, has mathematically proven fast convergence and achieves high classification accuracy with low overhead. We provide proof of convergence of this algorithm in $O(1/n)$ time and network benchmarks showing significant reduction in error detection rate by a factor of 20 times compared to existing algorithms based on a static sampling rate.

We have discussed above the importance of developing analytical frameworks to compute the detection likelihood. Such a parameter turns out to be key in helping stabilize elephant flow detection algorithms in highly dynamic environments as those found in real networks. On one hand, it allows us to know the degree of certainty that the detection is correct; on the other, it allows us to know when we have not collected enough information to make a sound detection decision. Further, while the theoretical presence of optimal cut-off sampling rates has been recognized previously, there was no computationally efficient, practical technique to determine the optimal cut-off sampling rate.

Thus, the techniques described herein can quickly and efficiently identify flows in a network that are large enough to affect the quality of service of smaller flows. These techniques are not domain-specific, are not based on thresholds for a specific flow size metric, and do not require several hyperparameters. As such, thee techniques can be easy adaptation to the great variety of traffic distributions present in real-world networks. In various embodiments, the techniques described herein are shown to be capable of determining the optimal sampling rate in a computationally efficient, practical manner. Such an approach can lead to substantial packet processing savings, resulting performance improvement of a a network device in terms of speed up, and reduction in memory and/or processing resources requirements, while maintaining high accuracy. The techniques described herein can be integrated as part of an SDN network architecture for large-scale data centers. Using these techniques, real time traffic engineering in a real data center or wide-area SDN can be performed.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for sampling a stream of packets arriving at a network node at an optimized sampling rate, so as to facilitate efficient classification of network flows corresponding to the stream of packets arriving at a network node, the method comprising:
    (a) at a selected sampling rate, sampling a packet from the stream of packets arriving at the network node;
    (b) for each candidate number of elephant flows in a set of candidate numbers computing, and storing in a cache of candidate elephant flows associated with the stream of packets, a respective detection likelihood using the sampled packet; and
    (c) updating the selected sampling rate according to the one or more detection likelihoods,
    wherein the computation of the respective detection likelihood for a particular candidate number of elephant flows is based on pairwise probabilities of relative flow sizes of flow pairs in the cache, and comprises, for each pair of flows in a cache of flows, updating a pairwise probability of relative flow sizes using flow-size metrics of flows in the pair and the sampled packet.

2. The method of claim 1, wherein updating the pairwise probability of relative flow sizes for a pair comprises:
    determining whether the sampled packet belongs to a first flow of the pair, or a second flow of the pair, or to neither flow of the pair; and
    updating the pairwise probability of relative flow sizes based on the determination.

3. The method of claim 1, wherein updating the pairwise probability of relative flow sizes for a pair comprises:
    selecting, based on the determination, a Beta distribution based function of positive and negative flow-size metrics;
    computing an adjustment factor using the selected function and the positive and negative flow-size metrics associated with each flow in the pair; and
    updating the pairwise probability using an adjustment factor.

4. The method of claim 2, wherein updating the pairwise probability of relative flow sizes for a first pair comprises:
    determining that a flow-size metric for a first flow in a first pair is the same as a flow-size metric for a first flow in a second pair, wherein: (i) a second flow in the second pair is the same as a second flow in the first pair, and (ii) the pairwise probability for the second pair was updated; and
    copying the pairwise probability for the second pair as the pairwise probability for the first pair.

5. The method of claim 1, wherein a flow-size metric comprises a positive metric and a negative metric, the method further comprising, for each flow in the cache, updating a respective flow-size metric by:
    incrementing a positive metric associated with the flow if the sampled packet belongs to the flow; and
    otherwise, incrementing a negative metric associated with the flow.

6. The method of claim 1, wherein updating the selected sampling rate comprises:
    if for at least one candidate number of elephant flows the detection likelihood is greater than a specified threshold, decreasing or maintaining the sampling rate; and
    otherwise, increasing the sampling rate.

7. The method of claim 1, further comprising repeating the steps (a) through (c) using the updated sampling rate.

8. The method of claim 1, wherein the set of candidate numbers of elephant flows comprises numbers from one through a number of flows in the cache minus one.

9. The method of claim 1, wherein for at least one candidate number of elephant flows the detection likelihood is greater than a specified threshold, the method further comprising:
    identifying a largest candidate number of elephant flows ($\hat{\in}$) for which the detection likelihood is greater than the specified threshold; and
    designating first $\hat{\in}$ flows in the cache as elephant flows.

10. The method of claim 1, further comprising initializing the cache by:
    sampling a plurality of packets from the stream of packets arriving at the network node at the selected sampling rate;
    identifying a flow associated with each one of the sampled plurality of packets;
    computing a flow-size metric for each identified flow; and
    including $\gamma$ flows having largest flow-size metrics in the cache, wherein size of the cache is $\gamma$.

11. The method of claim 10, wherein a total number of identified flows is greater than $\gamma$.

12. The method of claim 1, further comprising updating the cache by:
    removing a removable flow from the cache when a flow removal condition occurs;
    replacing in the cache the removed flow with a new flow associated with the stream of packets; and
    updating pairwise probabilities for all pairs comprising the new flow using an initial flow-size metric for the new flow.

13. The method of claim 12, wherein the flow removal condition occurs: (i) when a flow-size metric for the removable flow is not updated during a specified time window, or (ii) when a cache update time period has elapsed since a previous cache update, and a flow-size metric for the removable flow is smallest among flow-size metrics for all flows in the cache.

14. The method of claim 12, wherein:
the cache comprises a dummy flow that is not associated with the stream of packets, a flow-size metric for the dummy flow being the initial flow-size metric; and
updating the pairwise probabilities for all pairs comprising the new flow comprises designating the dummy flow as the new flow;
the method further comprising copying the dummy flow and designating the copy as the dummy flow.

15. The method of claim 1, wherein the selected sampling rate is updated to a value in a range from 0.000001 up to 1.0.

16. The method of claim 1, wherein a rate of arrival of the packets in the stream is in a range from 1 kbps up to 100 Tbps.

17. The method of claim 1, wherein a sampled packet belongs to a particular flow based on at least one of:
a pair of source and destination addresses in a header of the sampled packet;
a pair of source and destination port numbers in the header of the sampled packet;
a virtual local area network (VLAN) identifier included in the header of the sampled packet; or
a multiprotocol label switching (MPLS) label included in the header of the sampled packet.

18. The method of claim 1, wherein a flow-size metric for a flow is based on one or more of:
(i) a number of packets belonging to the flow at a time of computing the flow-size metric;
(ii) a number of bytes belonging to the flow at the time of computing the flow-size metric;
(iii) an average number of packets belonging to the flow per unit time; and
(iv) an average number of bytes belonging to the flow per the unit time.

19. The method of claim 1, wherein after updating the selected sampling rate, the selected sampling rate is not updated at least for a specified rate adjustment interval.

20. The method of claim 1, wherein:
increasing the selected sampling rate comprises increasing the selected sampling rate by a first step size; and
decreasing the selected sampling rate comprises decreasing the selected sampling rate by a second step size.

21. A system for sampling a stream of packets arriving at a network node at an optimized sampling rate, so as to facilitate efficient classification of network flows corresponding to the stream of packets arriving at a network node, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, configure the processing unit to:
(a) sample, at a selected sampling rate, a packet from the stream of packets arriving at the network node;
(b) compute and store in a cache of candidate elephant flows associated with the stream of packets, for each candidate number of elephant flows in a set of candidate numbers, a respective detection likelihood using the sampled packet; and
(c) update the selected sampling rate according to the one or more detection likelihoods,
wherein the computation of the detection likelihood for a particular candidate number of elephant flows is based on pairwise probabilities of relative flow sizes of flow pairs in the cache, and the instructions further program the processing unit to:
update, for each pair of flows in a cache of flows, a pairwise probability of relative flow sizes using flow-size metrics of flows in the pair and the sampled packet.

22. The system of claim 21, wherein to update the pairwise probability of relative flow sizes for a pair the instructions program the processing unit to:
determine whether the sampled packet belongs to a first flow of the pair, or a second flow of the pair, or to neither flow of the pair; and
update the pairwise probability of relative flow sizes based on the determination.

23. The system of claim 22, wherein to update the pairwise probability of relative flow sizes for a pair the instructions program the processing unit to:
select, based on the determination, a Beta distribution based function of positive and negative flow-size metrics;
compute an adjustment factor using the selected function and the positive and negative flow-size metrics associated with each flow in the pair; and
update the pairwise probability using an adjustment factor.

24. The system of claim 22, wherein to update the pairwise probability of relative flow sizes for a first pair the instructions program the processing unit to:
determine that a flow-size metric for a first flow in a first pair is the same as a flow-size metric for a first flow in a second pair, wherein: (i) a second flow in the second pair is the same as a second flow in the first pair, and (ii) the pairwise probability for the second pair was updated; and
copy the pairwise probability for the second pair as the pairwise probability for the first pair.

25. The system of claim 21, wherein a flow-size metric comprises a positive metric and a negative metric, and to update a respective flow-size metric for each flow in the cache, the instructions program the processing unit to:
increment a positive metric associated with the flow if the sampled packet belongs to the flow; and
otherwise, increment a negative metric associated with the flow.

26. The system of claim 21, wherein to update the selected sampling rate the instructions program the processing unit to:
decrease or maintain the sampling rate, if for at least one candidate number of elephant flows the detection likelihood is greater than a specified threshold; and
otherwise, increase the sampling rate.

27. The system of claim 21, wherein the instructions further program the processing unit to repeat operations (a) through (c) using the updated sampling rate.

28. The system of claim 21, wherein the set of candidate numbers of elephant flows comprises numbers from one through a number of flows in the cache minus one.

29. The system of claim 21, wherein for at least one candidate number of elephant flows the detection likelihood is greater than a specified threshold, and the instructions further program the processing unit to:
identify a largest candidate number of elephant flows ($\hat{E}$) for which the detection likelihood is greater than the specified threshold; and
designate first $\hat{E}$ flows in the cache as elephant flows.

30. The system of claim 21, wherein to initialize the cache, the instructions further program the processing unit:
sample a plurality of packets from the stream of packets arriving at the network node at the selected sampling rate;
identify a flow associated with each one of the sampled plurality of packets;
compute a flow-size metric for each identified flow; and
include γ flows having largest flow-size metrics in the cache, wherein size of the cache is γ.

31. The system of claim 30, wherein a total number of identified flows is greater than γ.

32. The system of claim 21, wherein to update the cache, the instructions further program the processing unit to:
remove a removable flow from the cache when a flow removal condition occurs;
replace in the cache the removed flow with a new flow associated with the stream of packets; and
update pairwise probabilities for all pairs comprising the new flow using an initial flow-size metric for the new flow.

33. The system of claim 32, wherein the flow removal condition occurs: (i) when a flow-size metric for the removable flow is not updated during a specified time window, or (ii) when a cache update time period has elapsed since a previous cache update, and a flow-size metric for the removable flow is smallest among flow-size metrics for all flows in the cache.

34. The system of claim 32, wherein:
the cache comprises a dummy flow that is not associated with the stream of packets, a flow-size metric for the dummy flow being the initial flow-size metric;
to update the pairwise probabilities for all pairs comprising the new flow, the instructions program the processing unit to designate the dummy flow as the new flow; and
the instructions further program the processing unit to copy the dummy flow and designating the copy as the dummy flow.

35. The system of claim 21, wherein the selected sampling rate is updated to a value in a range from 0.000001 up to 1.0.

36. The system of claim 21, wherein a rate of arrival of the packets in the stream is in a range from 1 kbps up to 100 Tbps.

37. The system of claim 21, wherein the instructions program the processing unit to determine a particular flow to which a sampled packet belongs based on at least one of:
a pair of source and destination addresses in a header of the sampled packet;
a pair of source and destination port numbers in the header of the sampled packet;
a virtual local area network (VLAN) identifier included in the header of the sampled packet; or
a multiprotocol label switching (MPLS) label included in the header of the sampled packet.

38. The system of claim 21, wherein a flow-size metric for a flow is based on one or more of:
(i) a number of packets belonging to the flow at a time of computing the flow-size metric;
(ii) a number of bytes belonging to the flow at the time of computing the flow-size metric;
(iii) an average number of packets belonging to the flow per unit time; and
(iv) an average number of bytes belonging to the flow per the unit time.

39. The system of claim 21, wherein after updating the selected sampling rate, the instructions program the processing unit to suspend updating the selected sampling rate at least for a specified rate adjustment interval.

40. The system of claim 21, wherein:
to increase the selected sampling rate, the instructions program the processing unit to increase the selected sampling rate by a first step size; and
to decreasing the selected sampling rate, the instructions program the processing unit to decrease the selected sampling rate by a second step size.

* * * * *